(12) United States Patent  
Ishizaki et al.

(10) Patent No.: US 6,966,532 B2
(45) Date of Patent: Nov. 22, 2005

(54) DISPLAY ORIENTATION ADJUSTMENT APPARATUS

(75) Inventors: Takashi Ishizaki, Shizuoka (JP); Kenichi Hirasawa, Tokyo (JP)

(73) Assignees: Murakami Corporation, Shizuoka (JP); NEC-Mitsubishi Electric Visual Systems Corporation, Tokyo (JP)

( * ) Notice: Subject to any disclaimer, the term of this patent is extended or adjusted under 35 U.S.C. 154(b) by 56 days.

(21) Appl. No.: 10/763,177

(22) Filed: Jan. 26, 2004

(65) Prior Publication Data

US 2004/0149873 A1 Aug. 5, 2004

(30) Foreign Application Priority Data

Feb. 3, 2003 (JP) ............................. 2003-026228

(51) Int. Cl.[7] ............................................. E04G 3/00
(52) U.S. Cl. ............................ 248/274.1; 248/125.1; 248/919; 248/917; 248/292.14; 361/681
(58) Field of Search .................... 248/274.1, 276.1, 248/917, 371, 125.1, 283.1, 919, 292.14; 361/681; 192/55.1, 56.61, 69.8

(56) References Cited

U.S. PATENT DOCUMENTS

| | | | | |
|---|---|---|---|---|
| 5,687,939 A | * | 11/1997 | Moscovitch | ............. 248/122.1 |
| 5,854,735 A | * | 12/1998 | Cheng | ......................... 361/681 |
| 5,923,528 A | * | 7/1999 | Lee | ............................. 361/681 |
| 5,941,493 A | * | 8/1999 | Cheng | ......................... 248/371 |
| 6,189,842 B1 | * | 2/2001 | Bergeron Gull et al. | . 248/125.1 |
| 6,189,850 B1 | * | 2/2001 | Liao et al. | ............. 248/292.14 |
| 6,443,408 B1 | * | 9/2002 | Hung | ...................... 248/176.1 |
| 6,510,049 B2 | * | 1/2003 | Rosen | ........................ 361/681 |
| 6,554,238 B1 | * | 4/2003 | Hibberd | .................. 248/278.1 |
| 6,654,068 B1 | * | 11/2003 | Brewington et al. | ........ 348/827 |
| 6,867,962 B2 | * | 3/2005 | Cho et al. | .................... 361/681 |
| 2003/0075649 A1 | * | 4/2003 | Jeong et al. | ................ 248/157 |
| 2004/0084585 A1 | * | 5/2004 | Watanabe et al. | ........ 248/276.1 |

FOREIGN PATENT DOCUMENTS

| | | |
|---|---|---|
| JP | 3063920 | 9/1999 |
| WO | WO 01/37070 A2 | 5/2001 |
| WO | WO 03/050787 A1 | 6/2003 |

* cited by examiner

*Primary Examiner*—Anita M. King
(74) *Attorney, Agent, or Firm*—Oblon, Spivak, McClelland, Maier & Neustadt, P.C.

(57) ABSTRACT

A movable part 10 of a display orientation adjustment apparatus H is attached to a rear surface of a display, and pivotably supported by a base 20, and its pivotal motion is restricted by a stopper 50 within a permissible range. If the movable part 10 is pivoted beyond the restricted range by a pivoting force of a predetermined magnitude or greater, the stopper 50 is released. Therefore, even if the display is pivoted inadvertently beyond the permissible range of the pivotal motion, breakage of components thereof would never take place, and its normal state of use can easily be restored.

6 Claims, 16 Drawing Sheets

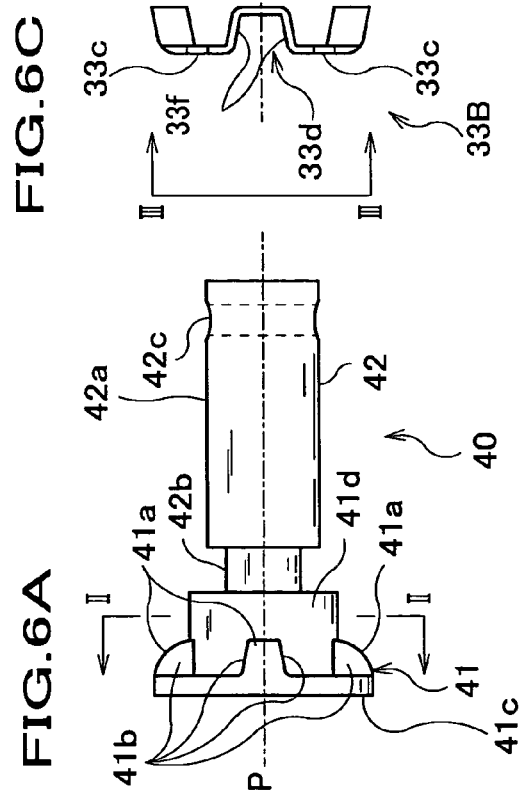
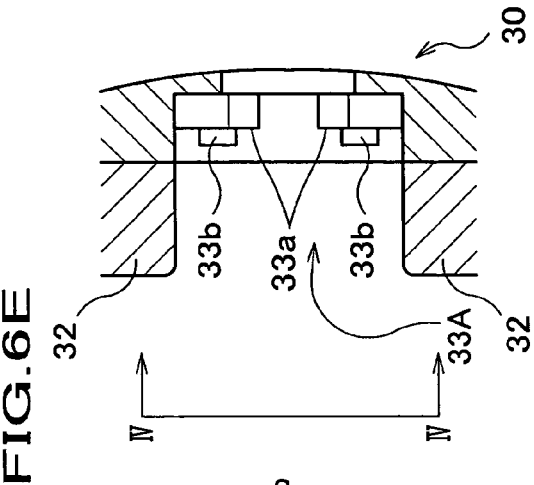
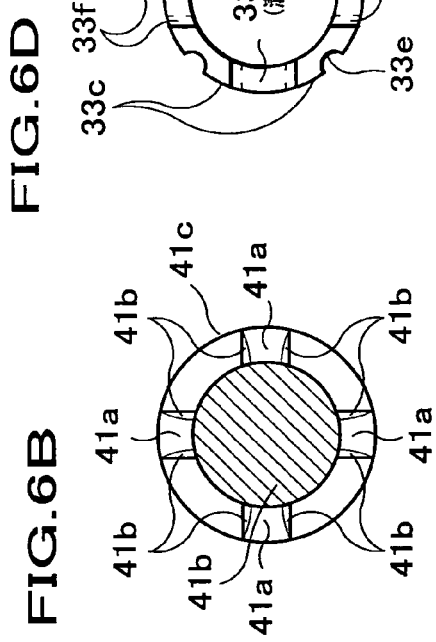
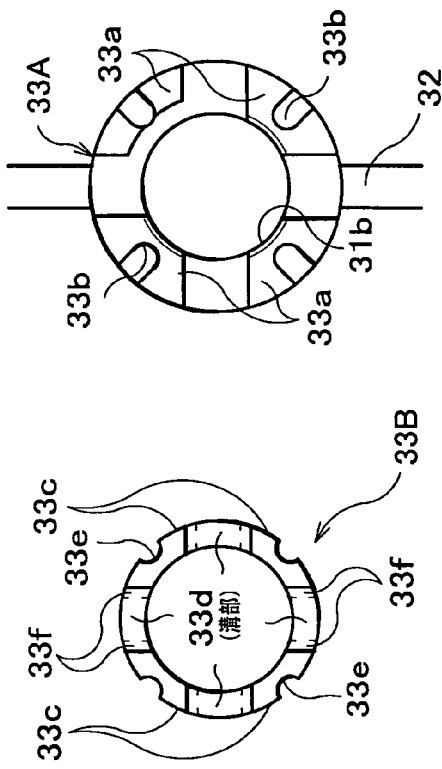
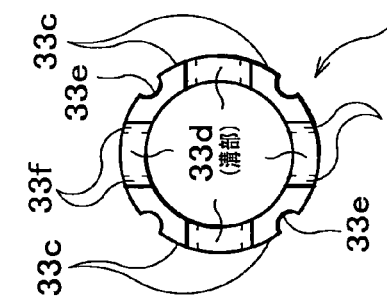

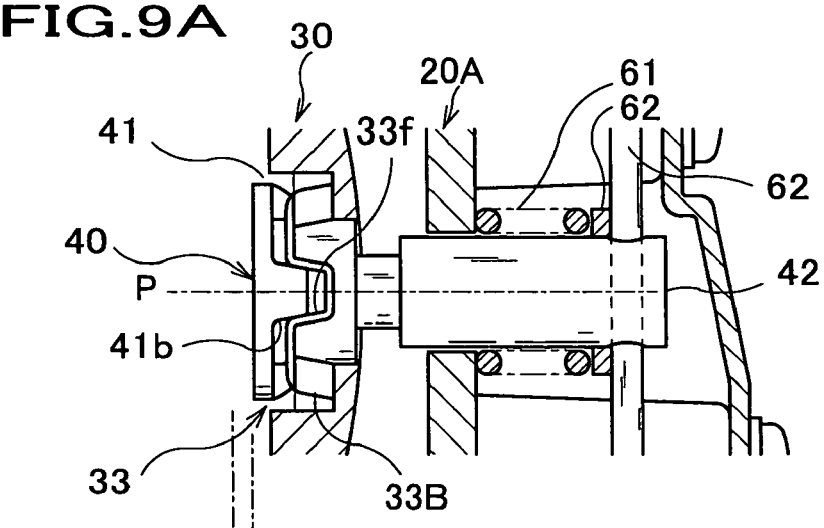
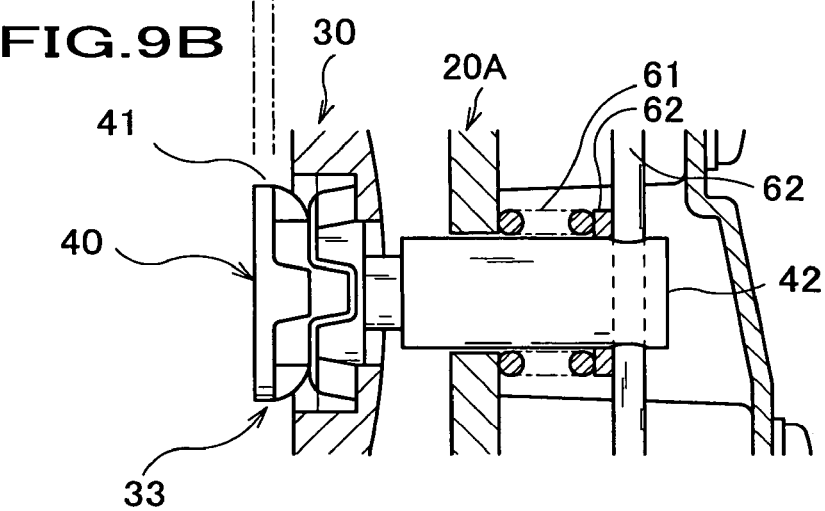
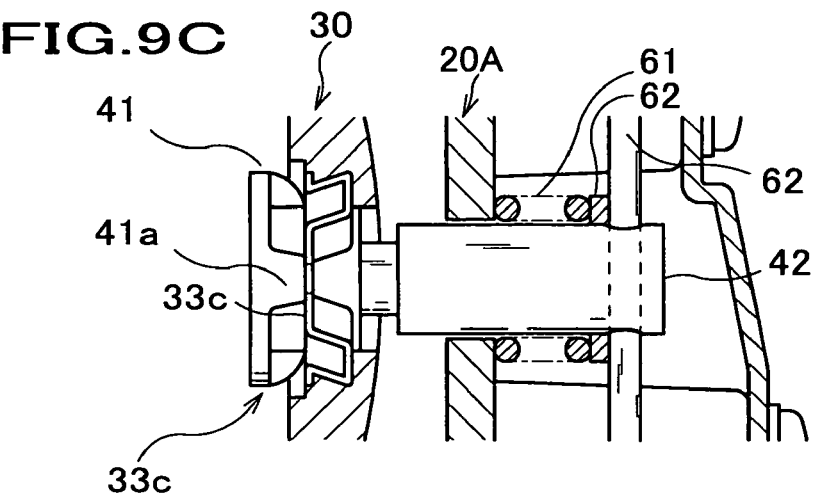

DISPLAY ORIENTATION ADJUSTMENT APPARATUS

BACKGROUND OF THE INVENTION

This invention relates to a display orientation adjustment apparatus for pivotably supporting a display of a computer or a television receiver in a manner that permits the display to rotate on (or pivot about) an axis substantially perpendicular to a screen thereof such that pivotal motion of the display takes place in a plane containing the screen.

Historically, computer or television displays (also called "monitors") have been viewed only in landscape (horizontal) orientation, and thus landscape displays are now in common use. However, in some particular uses, portrait (vertical) orientation may be preferable. For example, in cases where a user uses a computer as a word-processor to edit or view A4 or letter-size documents, portrait viewing orientation fit to the orientation of the documents would serve to save its screen area and to facilitate editing or other word-processing operations.

Against this backdrop, proposed for example in Japanese Utility Model Registration No. 3063920 is a display orientation adjustment apparatus (hereinafter referred to as "orientation adjustment apparatus") for pivotably supporting a display in a manner that permits the display to be rotated 90 degrees on an axis substantially perpendicular to a screen thereof.

Among various forms of mechanisms for the orientation adjustment apparatus known in the art, for example, is one like the orientation adjustment apparatus H shown in FIG. 12B in which a movable part 110 shaped like a spherical segment is slidably held by or supported with a base 120 on a spherical surface thereof.

The orientation adjustment apparatus H principally includes, as shown in FIG. 13, a movable part 110 mounted on the back of the display D (see FIG. 12B), a base 120 fixed on an upper portion of a front face of a stand M, and a support cap 130 disposed inside the movable part 110.

The movable part 110 includes a mounting plate 110A attached to the back of the display D, and a flange 110B fixed on the mounting plate 110A. The mounting plate 110A includes four pivotal motion restricting portions 112 each protruding toward the flange 110B. The flange 110B includes a spherical zone portion 113, and a flat portion 114 formed along an outer brim of the spherical zone portion 113. The spherical zone portion 113 includes a surface 113a (hereinafter referred to as "base-side sliding surface 113a") facing toward the base 120, and a surface 113b (hereinafter referred to as "display-side sliding surface 113b") facing toward the display D, each taking the shape of a spherical zone.

The base 120 includes a base body 120A fixed on the stand M, and a spacer is 120B that is shaped like a spherical zone and attached to a front opening of the base body 120A. The spacer 120B of the base 120 includes a receiving surface 125 shaped like a spherical zone, and is to be brought into contact with the base-side sliding surface 113a (see FIG. 16) of the flange 110B.

The support cap 130 disposed inside the movable part 110 and the spacer 120B of the base 120 sandwich the spherical zone portion 113 of the flange 110B, thereby slidably supporting the movable part 110 on the base 120.

The support cap 130 includes a dome portion 131 having the shape of a dome, a pair of wall portions 132 formed inside the dome portion 131 so as to extend toward the display D, and a projection 133 provided at the center of a surface 131a (hereinafter referred to as "pressing surface 131a"; see FIG. 16) of the dome portion 131 facing toward the base 120. The pressing surface 131a is brought into contact with the display-side sliding surface 113b of the flange 110B.

FIG. 14 is a side view in cross section of the orientation adjustment apparatus H. As shown in FIG. 14, the support cap 130 is attached to the base 120 by inserting the projection 133 into an insertion hole 121a of the base body 120A. A bolt 141 is inserted through a hole provided in the projection 133 from a display D side (from inside of the dome portion 131), and a spring (resilient member) 143 in a compressed state is coiled around a shank 141a of the bolt 141 partially protruded through the hole of the projection 133 toward the base body 120A. The spring 143 is compressed with a nut 142 screwed at the tip of the bolt 141, and the resiliency of the compressed spring 143 presses the bolt 141 toward the base 120. The bolt 141 in turn presses the support cap 130 toward the base 120, and eventually presses the movable part 110 toward the base 120. Consequently, the movable part 110 is slidably sandwiched between the support cap 130 and the base 120, so that the display D can be rotated (or pivoted) about an axis substantially perpendicular to a screen thereof as shown in FIG. 12A, rotated (or tilted) about a horizontal axis as shown in FIG. 12B, and rotated (or swiveled) about a vertical axis as shown in FIG. 12C.

The range of pivotal motion of the movable part 110 (i.e., display D) is restricted by the wall portions 132. To be more specific, as shown in FIGS. 15A to 15F, the movable part 110 can be pivoted without restriction until the pivotal motion restricting portions 112 formed on the mounting plate 110A are brought into contact with the wall portions 132 of the support cap 130, but once the pivotal motion restricting portions 112 are brought into contact with the wall portions 132, no farther pivotal motion of the movable part 110 becomes impossible. In other words, in the illustrated orientation adjustment apparatus H, the wall portions 132 formed on the support cap 130 serve as a stopper to restrict the pivotable range of the movable part 110.

If pivotal motion were imparted to the support cap 130 together with the movable part 110 pivoted by a user, the wall portions 132 provided on the support cap 130 could not serve as a stopper to stop the movable part 110; therefore, as shown in FIG. 16, the cross section of the columnar projection 133 of the support cap 130 and the insertion hole 121a of the base body 120A are given a substantially elliptic (noncircular) shape so as to impede the pivotal motion of the support cap 130.

However, normal use situations aside, in cases where the display D is inadvertently pivoted beyond the pivotable range, all the pivoting force concentrate on the projection 133 of the support cap 130, which could disadvantageously cause a proximal portion of the projection 133 to rupture as the case may be. In this case, the display D cannot be held in an intended position, and the support cap 130, as is incorporated inside the movable part 110, cannot be replaced with ease.

The disadvantageous situation as described above involves a common problem that could be encountered not only in the illustrated orientation adjustment apparatus but also in any other orientation adjustment apparatuses capable of pivoting a display in a plane containing a screen thereof.

The present invention has been made to address the above problem.

SUMMARY OF THE INVENTION

In one aspect of the present invention, there is provided a display orientation adjustment apparatus for supporting a display in a manner that permits the display to pivot about an axis substantially perpendicular to a screen thereof. The display orientation adjustment apparatus includes a movable part attached to a rear surface of the display, a base for pivotably supporting the movable part, and a stopper for restricting a range of pivotal motion of the movable part. The stopper is configured to be released if the movable part is pivoted beyond the restricted range by a pivoting force of a predetermined magnitude or greater.

According to the above display orientation adjustment apparatus, when the pivotal motion of the movable part in a plane containing a screen of the display (i.e., about an axis substantially perpendicular to the screen) is impeded by the stopper, to be more specific, when the movable part comes to a limit of the restricted range of the pivotal motion, a pivoting force of the predetermined magnitude or greater acting on the stopper would release the impeded state of the stopper, allowing the movable part to pivot beyond the restricted range, so that the excessive pivoting force as above would never concentrate on the components such as the movable part and the stopper, thus preventing breakage thereof.

The above display orientation adjustment apparatus may further include a support cap for pressing the movable part toward a base side, and a corotation restricting member for restricting pivotal motion of the support cap. The above stopper is mounted in this support cap. This corotation restricting member includes a first engageable part and a shaft part protruding from the first engageable part. The support cap includes a second engageable part, and the first engageable part of the corotation restricting member is engageable with the second engageable part of the support cap from a display side. The shaft part is mounted on the base in a manner that prohibits the shaft part from pivoting about an axis thereof and that permits the shaft part to move along the axis if the first engageable part is pivoted beyond the restricted range by a pivoting force of the predetermined magnitude or greater. If the first engageable part of the corotation restricting member engaged with the second engageable part of the support cap is pivoted beyond the restricted range by a pivoting force of the predetermined magnitude or greater, the shaft part of the corotation restricting member moves toward the display side, and gets disengaged from the second engageable part of the support cap.

This display orientation adjustment apparatus is configured to have the base and the support cap sandwiching and pivotably holding the movable part, with the stopper restricting the range of the pivotal motion of the movable part. The support cap is restricted from pivoting by allowing the first engageable part of the corotation restricting member unpivotably mounted on the base to be engaged with the second engageable part thereof from the display side. The corotation restricting member is configured to move along the axis of the shaft part thereof when a pivoting force of the predetermined magnitude or greater acts on the first engageable part. Accordingly, if a pivoting force of the predetermined magnitude or greater acts on the stopper and transmits to the first engageable part, the shaft part of the corotation restricting member moves toward the display side, releasing the engagement of the first engageable part thereof with the second engageable part of the support cap. To be more specific, when the movable part comes to a limit of the restricted range of the pivotal motion, a pivoting force of the predetermined magnitude or greater acting on the stopper would move the first engageable part of the corotation restricting member toward the display side and release the engagement with the second engageable part of the support cap, allowing the movable part to pivot beyond the restricted range, so that the excessive pivoting force as above would never concentrate on the components such as support cap and the corotation restricting member, thus preventing breakage thereof.

As long as the first engageable part of the corotation restricting member is engaged with the second engageable part of the support cap, the support cap would not pivot together with the movable part, with the result that the position of the stopper mounted in the support cap can be kept at a fixed position. In other words, when the pivoting force acting on the stopper is below the predetermined magnitude, the stopper surely serves to restrict the range of the pivotal motion of the movable part.

In the above display orientation adjustment apparatus, the first engageable part of the corotation restricting member may preferably be stressed toward the base side.

According to the above display orientation adjustment apparatus, since the first engageable part of the corotation restricting member is stressed (biased) toward the base side, the first engageable part can securely be engaged with the second engageable part of the support cap under normal conditions of use. The stress (biasing force) may be adjusted in magnitude, so that an adjustment can be made in the pivoting force by which or greater the first engageable part of the corotation restricting member is disengaged from the second engageable part of the support cap. Thus, in order to release the engagement of the first engageable part of the corotation restricting member with the second engageable part of the support cap, the first engageable part should be moved against the stress (biasing force) toward the display side. More specifically, the greater the stress, the more difficult the release of the engagement becomes; while the smaller the stress, the easier the release of the engagement becomes.

The above display orientation adjustment apparatus may further include a stressing member mounted in the base for stressing the first engageable part of the corotation restricting member toward the base side, so that a stress generated by the stressing member causes the support cap to press the movable part toward the base side.

According to this display orientation adjustment apparatus, resilience of the stressing member is constantly transmitted through the corotation restricting member to the support cap, and thus the support cap is always stressed toward the base side, not only under the normal conditions in which the first engageable part of the corotation restricting member is engaged with the second engageable part of the support cap, but also under the conditions in which the first engageable part is disengaged from the second engageable part. In other words, the stressing member serves to stress the support cap under the normal conditions of use, as well as to enable adjustment to be made in the pivoting force by which or greater the engagement of the corotation restricting member with the support cap is released, and further to prevent the movable part from pivoting beyond a necessary range when the engagement is released. This construction contributes to reduced number of parts and simplified structure of the apparatus, thus leading to reduction in manufacturing costs thereof.

In the above display orientation adjustment apparatus, preferably, the first engageable part of the corotation restricting member may include a contact surface oblique to the axis of the shaft part, and the second engageable part of the support cap may include a stopper surface for contact with the contact surface of the first engageable part.

According to this display orientation adjustment apparatus, the first engageable part of the corotation restricting member and the second engageable part of the support cap are brought into contact with each other at their oblique surfaces; thus, the pivoting force acting on the support cap spontaneously generates a force for moving the first engageable part toward the display side. This causes the first engageable part to move toward the display side and to spontaneously get disengaged from the second engageable part of the support cap. This construction serves to easily and securely release the engagement when a pivoting force of a predetermined magnitude or greater is given to the movable part.

In the above display orientation adjustment apparatus, the movable part may include a sliding surface shaped like a spherical zone, and the base may include a receiving surface for slidable contact with the sliding surface.

Since the movable part of the above display orientation adjustment apparatus has a sliding surface shaped like a spherical zone, the movable part can not only be pivoted about an axis substantially perpendicular to a screen of the display (i.e., in a plane containing the screen), but also be tilted (about a horizontal axis with the top and bottom of the display moved frontward and rearward), and swiveled (about a vertical axis with the right and left sides of the display moved frontward and rearward). Consequently, the display can acquire an increased degree of flexibility in adjustment of its orientation.

Other advantages and further features of the present invention will become readily apparent from the following description of preferred embodiments with reference to accompanying drawings.

BRIEF DESCRIPTION OF THE DRAWINGS

FIG. 6A is a side elevation of a corotation restricting member as shown in FIG. 2.

FIG. 6B is a view of section taken along line II—II of FIG. 6A.

FIG. 6C is a side elevation of a clutch member as shown in FIG. 2.

FIG. 6D is an elevation of the clutch member as viewed from a direction indicated by an arrowed line III—III of FIG. 6C.

FIG. 6E is a partial side sectional view of a support cap as shown in FIG. 2.

FIG. 6F is an elevation of the support cap as viewed from a direction indicated by an arrowed line IV—IV of FIG. 6E.

FIGS. 8A through 8F are diagrams for explaining ordinary-time operation of the display orientation adjustment apparatus according to the present invention, in which FIGS. 8A, 8C and 8E are schematic diagrams showing normally varied orientations of the display, and FIGS. 8B, 8D and 8F are front elevations showing statuses of the orientation adjustment apparatus corresponding to the orientations of the display shown in FIGS. 8A, 8C and 8E.

FIGS. 9A through 9C are enlarged views of section showing operation of the corotation restricting member for explaining extraordinary-time operation of the display orientation adjustment apparatus according to the present invention.

FIGS. 15A through 15F are diagrams for explaining operation of the conventional orientation adjustment apparatus, in which FIGS. 15A, 15C and 15E are schematic diagrams showing normally varied orientations of the display, and FIGS. 15B, 15D and 15F are front elevations showing statuses of the orientation adjustment apparatus corresponding to the orientations of the display shown in FIGS. 15A, 15C and 15E.

DETAILED DESCRIPTION OF THE PREFERRED EMBODIMENTS

Figure 12B:
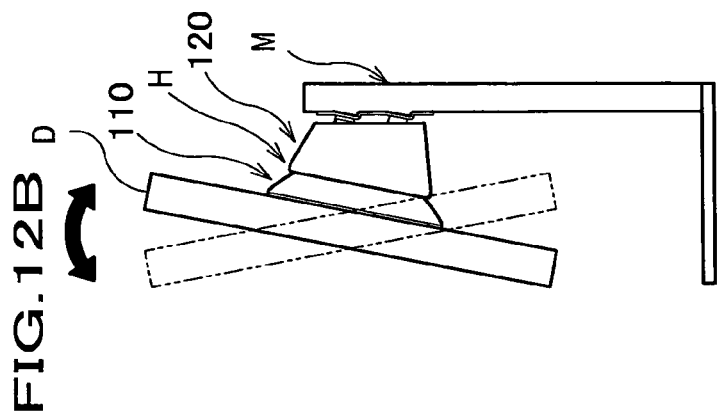
FIGS. 12A through 12C are schematic diagrams for explaining motions of the display.
Figure 12A:
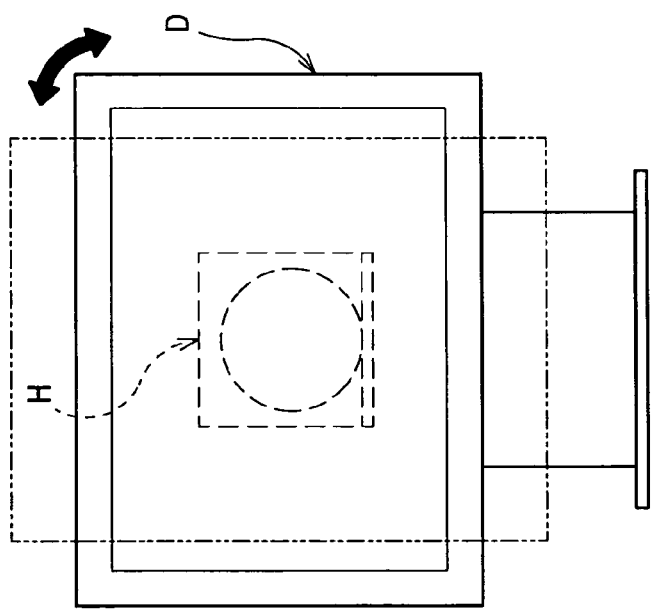
Figure 12C:
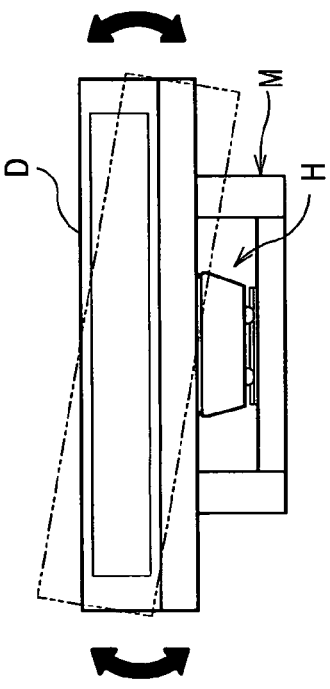
Figure 13:
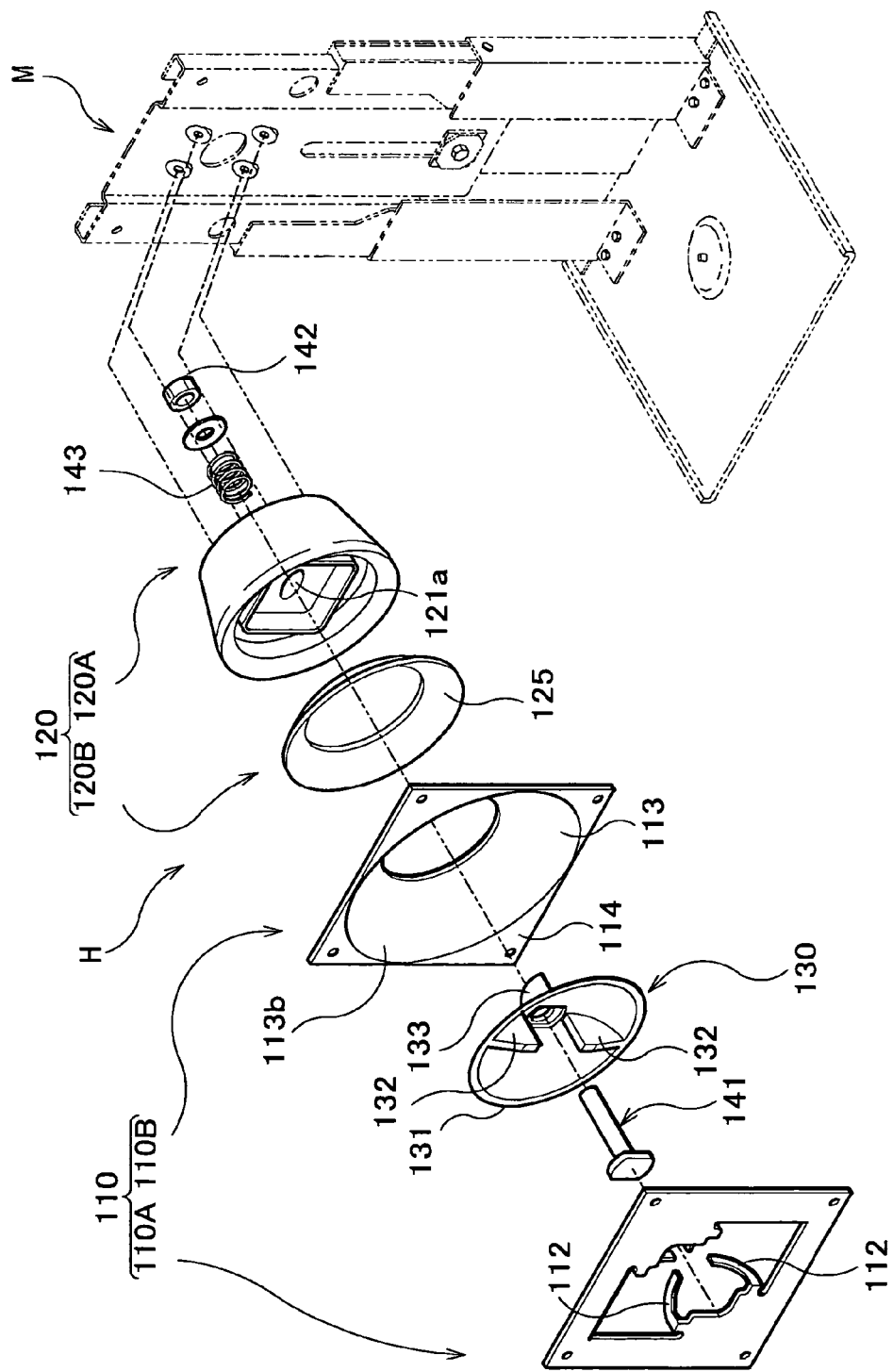
FIG. 13 is an exploded perspective view of a conventional display orientation adjustment apparatus as seen from a display side.
Figure 14:
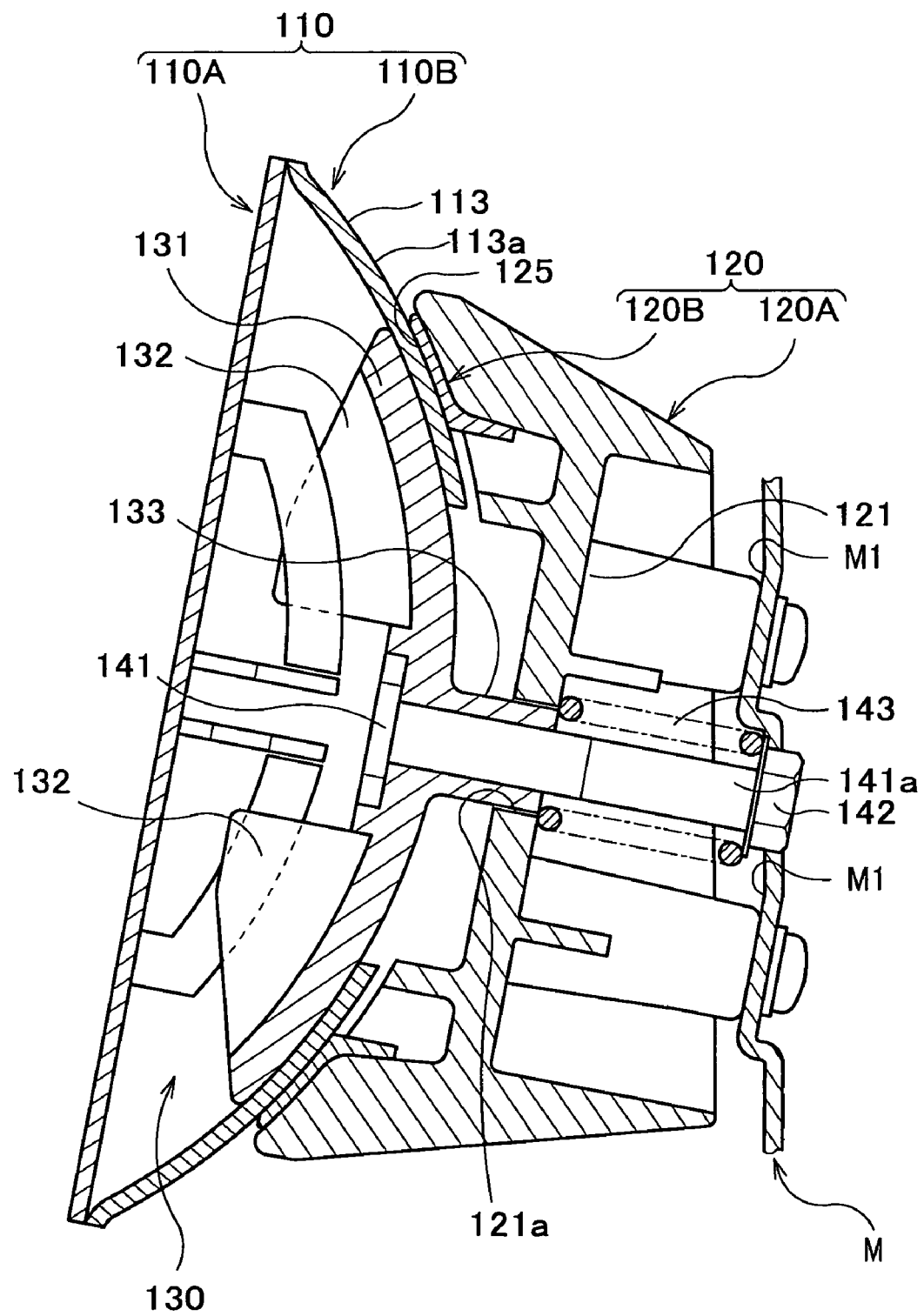
FIG. 14 is a side sectional view of the display orientation adjustment apparatus of FIG. 13.
Figure 15A:
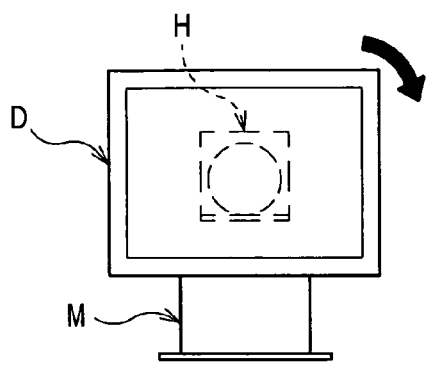
Figure 15B:
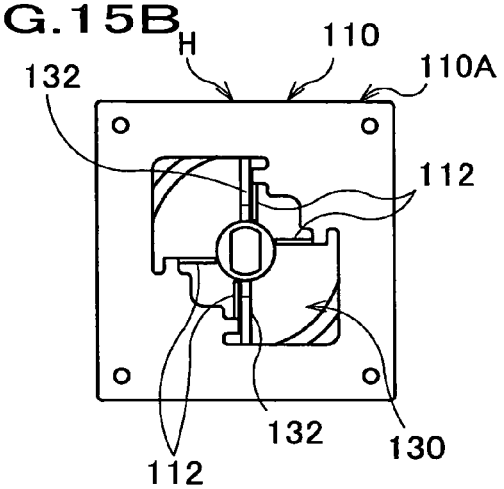
Figure 15C:
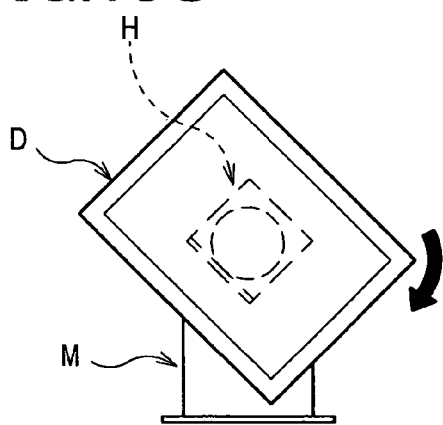
Figure 15D:
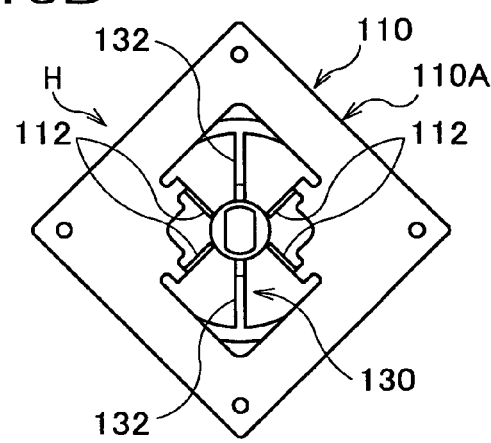
Figure 15E:
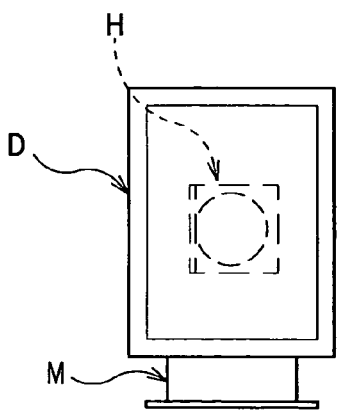
Figure 15F:
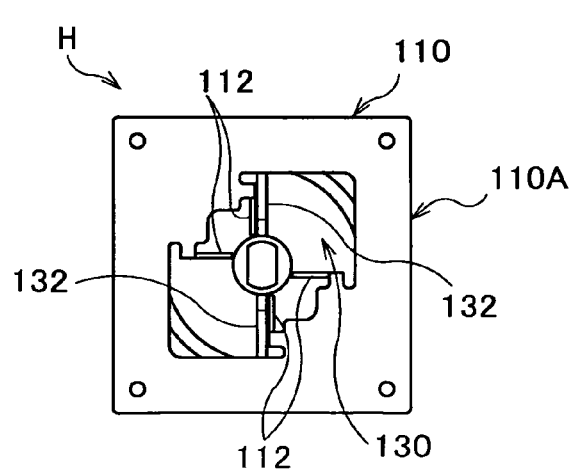
Figure 16:
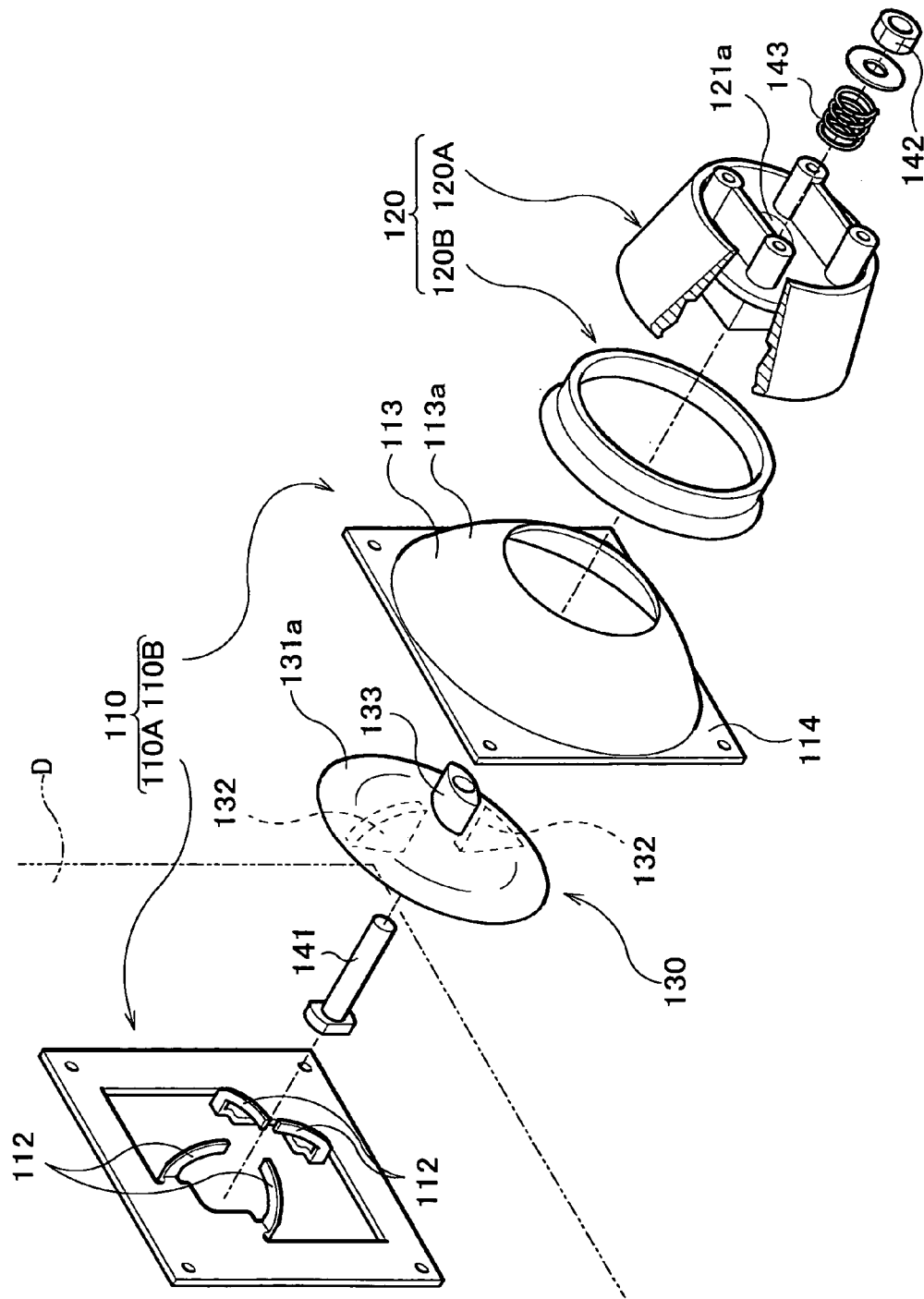
FIG. 16 is an exploded perspective view of the conventional display orientation adjustment apparatus as seen from a stand side.

A detailed description will now be given of preferred embodiments of the present invention with reference to the drawings. In describing the embodiments below, rotation of a display D about an axis substantially perpendicular to a screen thereof (see FIG. 12A) will be referred to as "pivot" or pivoting, rotation about a horizontal axis with the top and bottom thereof moved frontward and rearward (see FIG. 12B) will be referred to as "tilt" or tilting, and rotation about a vertical axis with the right and left sides moved frontward and rearward (see FIG. 12C) will be referred to as "swivel" or swiveling.

[First Embodiment]

Figure 1:
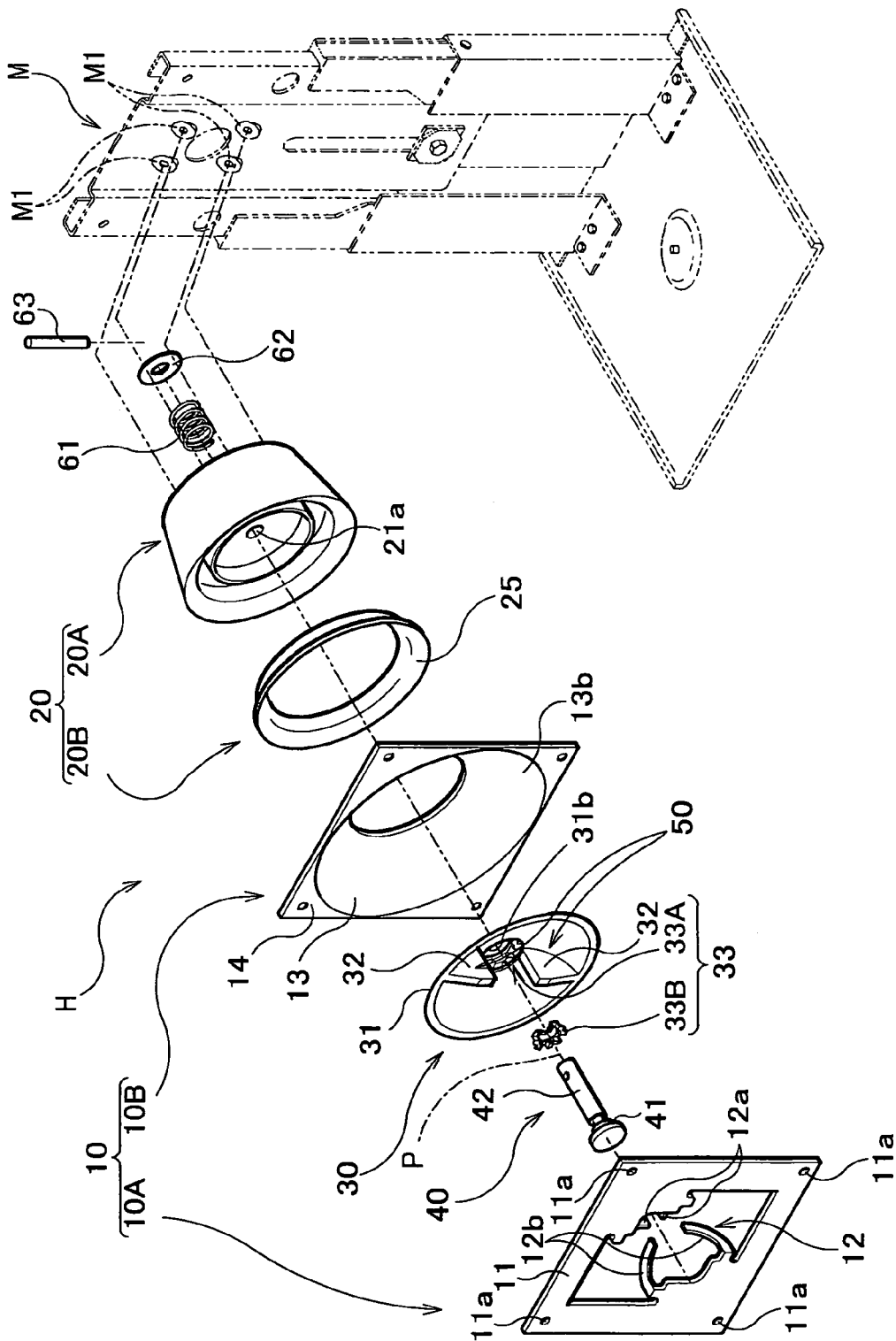
FIG. 1 is an exploded perspective view of a display orientation adjustment apparatus as seen from a display side.
Figure 2:
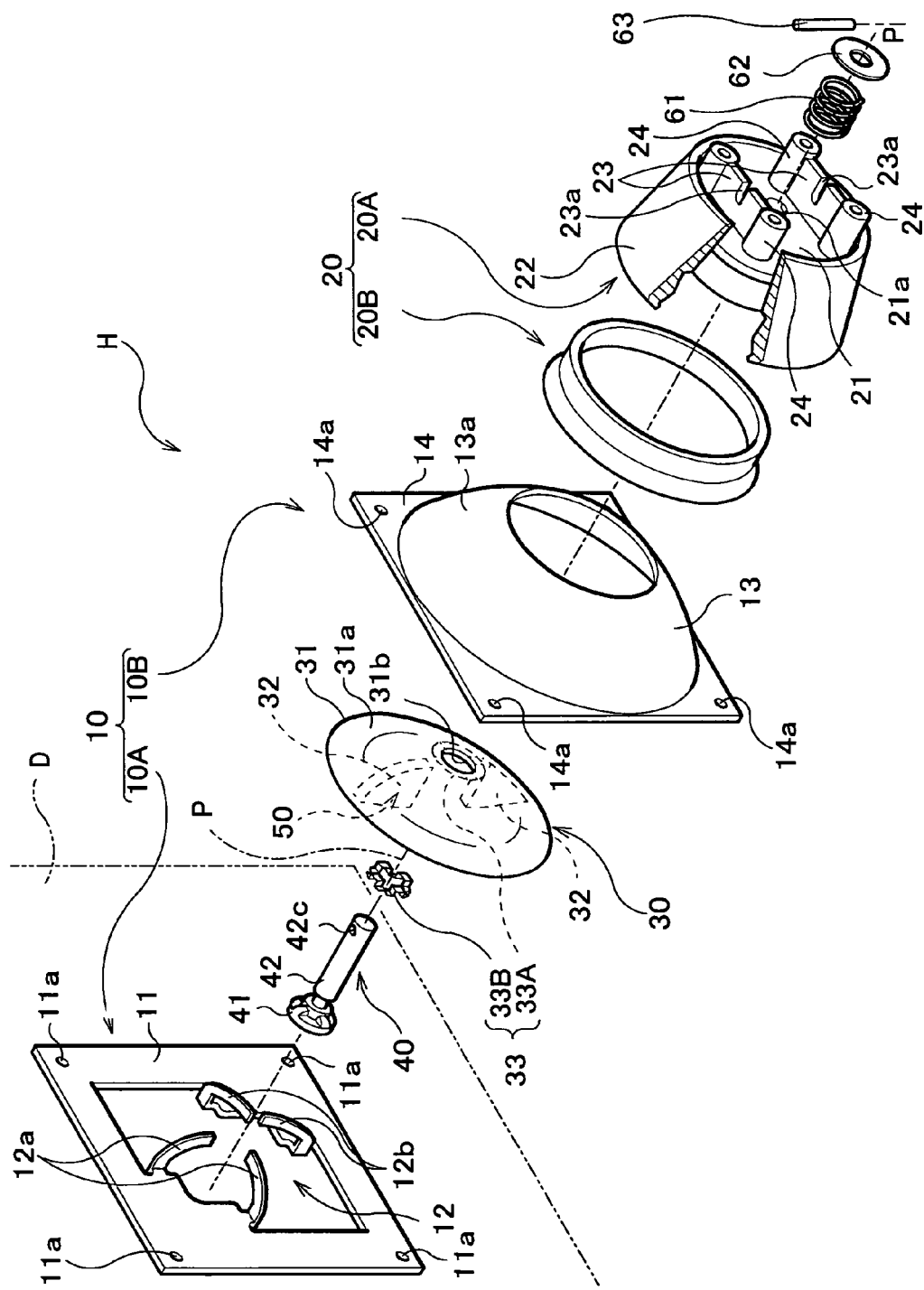
FIG. 2 is an exploded perspective view of the display orientation adjustment apparatus of FIG. 1 as seen from a stand side.

A first embodiment of the display orientation adjustment apparatus (hereinafter referred to as "orientation adjustment apparatus H") according to the present invention includes, as shown in FIGS. 1 and 2, a movable part 10 attached to a rear surface of the display D, a base 20 for pivotably supporting the movable part 10, a support cap 30 for pressing the movable part 10 toward a base 20 side, and a corotation restricting member 40 for restricting pivotal motion of the support cap 30. In the support cap 30 is mounted a stopper 50 for restricting a range of pivotal motion of the movable part 10. In this embodiment, the range of pivotal motion of the orientation adjustment apparatus H (i.e., support cap 30 or movable part 10 thereof) within which the display D can be pivoted is set at 90 degrees. This means that the orientation adjustment apparatus H can allow a user to arbitrarily select the orientation (landscape or portrait) of the display D.

The movable part 10 includes, as shown in FIGS. 1 and 2, a plastic mounting plate 10A to be attached to the rear surface of the display D, and a plastic flange 10B fixed on the mounting plate 10A.

Figure 3:
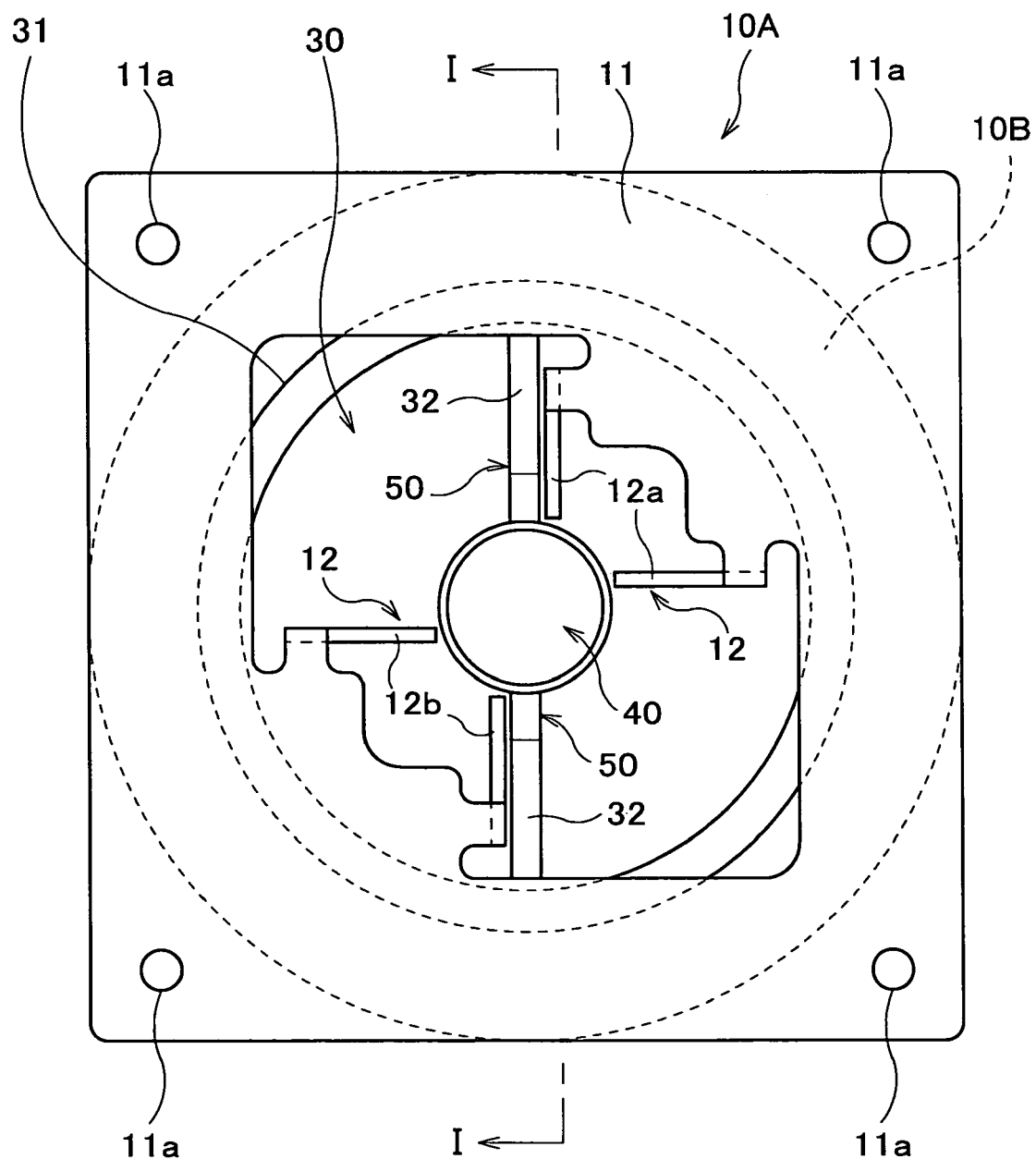
FIG. 3 is a rear elevation of the display orientation adjustment apparatus of FIG. 1 as seen from the display side.

The mounting plate 10A includes a frame 11 and a pivotal motion restricting portion 12 placed substantially in the middle section of the frame 11. The frame 11 has a rectangular outline, and mounting holes 11a formed at its four corners. The pivotal motion restricting portion 12, as shown in FIG. 3, includes a pair of first projection pieces 12a and a pair of second projection pieces 12b opposed to the first projection pieces 12a across wall portions 32 of a support cap 30 that will be described later. The paired projection pieces 12a are positioned along lines orthogonal to each other. Similarly, the paired projection pieces 12b are positioned along lines orthogonal to each other. As shown in FIG. 2, the first projection pieces 12a and the second projection pieces 12b are each formed so as to protrude from an inner edge of the frame 11 toward a flange 10B side, and to have a distal end thereof protruding toward the center of the frame 11. It is understood that the construction and arrangement of the pivotal motion restricting portion 12 is not limited to those as illustrated in the drawings, but any change may be made as appropriate; however, the shape and arrangement may preferably be selected from those capable of making contact with a side surface of the wall portion 32 of the support cap 30.

The flange 10B includes, as shown in FIGS. 1 and 2, a spherical zone portion 13 having inner and outer surfaces made spherical, and a flat portion 14 formed along an outer brim of the spherical zone portion 13. At four corners of the flat portion 14 are formed mounting holes 14a each in a position aligned with the corresponding mounting hole 11a of the mounting plate 10A. In the description that follows, a surface 13a of the spherical zone portion 13 facing toward the base 20 (see FIG. 2) will be referred to as "base-side sliding surface 13a", and a surface 13b thereof facing toward the display D (see FIG. 1) will be referred to as "display-side sliding surface 13b".

The base 20, as shown in FIGS. 1 and 2, includes a plastic base body 20A fixed on a mount M1 formed on an upper portion at a front surface of a stand M, and a plastic spacer 20B attached to a front opening (display D side opening) of the base body 20A.

The base body 20A includes, as shown in FIG. 2, a substantially circular bottom wall portion 21, a circumferential wall portion 22 formed along the circumference of the bottom wall portion 21 so as to substantially assume a frustum of a cone from outward appearances, a pair of mid-wall portions 23 that are provided on the bottom wall portion 21 so as to perpendicularly protrude therefrom, and four bosses 24 that are also provided on the bottom wall portion 21 so as to perpendicularly protrude therefrom. The bottom wall portion 21 is provided substantially at the center thereof with an insertion hole 21a through which a shaft part 42 of the corotation restricting member 40 that will be described later more in detail can be inserted. The paired mid-wall portions 23 are opposed to each other, and sandwich the insertion hole 21a. In each of the mid-wall portions 23, a U-shaped notch 23a is provided from a distal end of the mid-wall portion toward the bottom wall portion 21 in a direction parallel to an axis P of the shaft portion 42 of the corotation restricting member 40 that will be described later. The bosses 24 are provided to fix the base 20 to the mount M1 of the stand M as shown in FIG. 1, and are thus arranged so as to correspond to the arrangement of the mounts M1.

Figure 4:
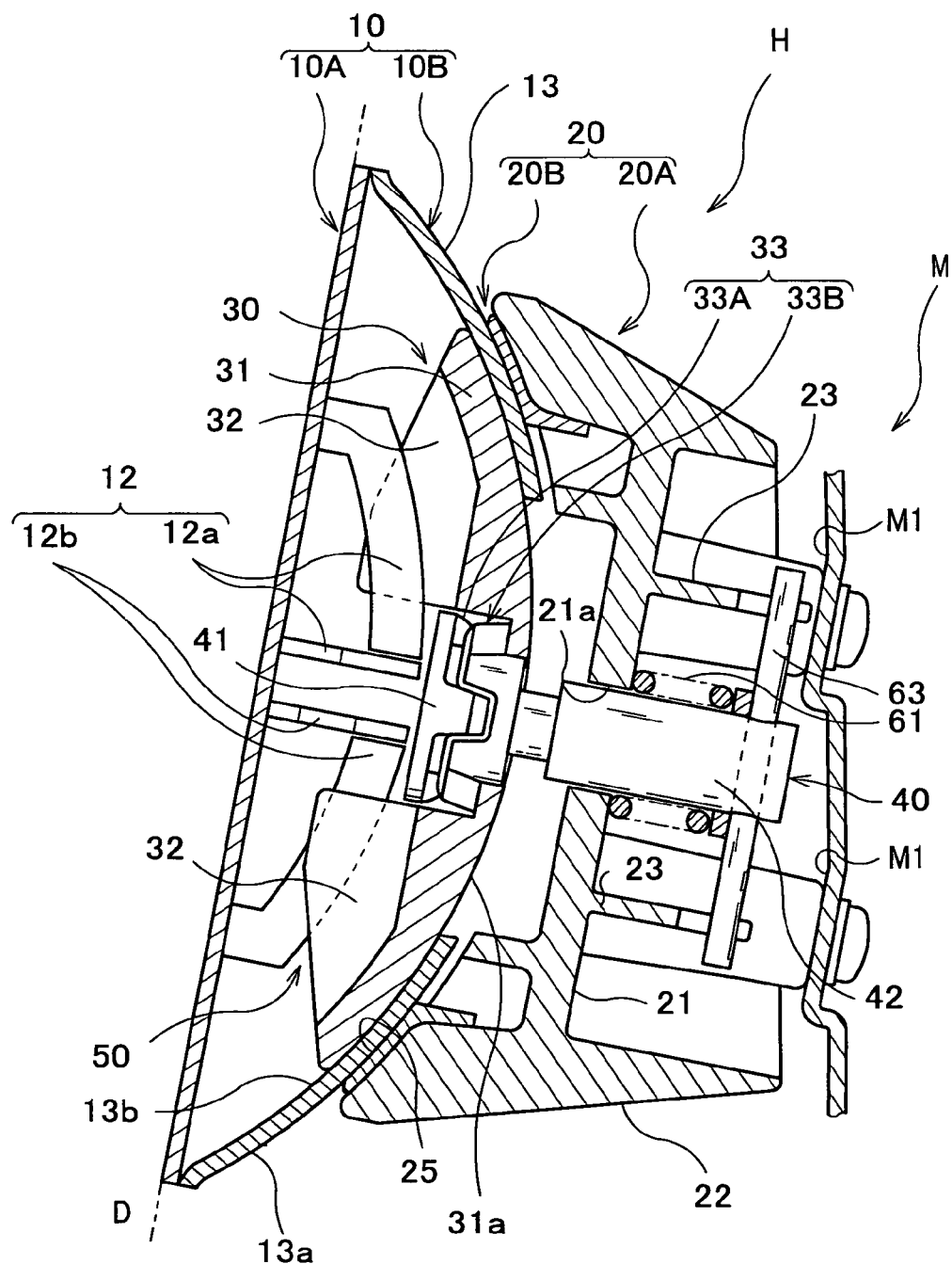
FIG. 4 is a view of section taken along line I—I of FIG. 3.

The spacer 20B, as shown in FIG. 1, has an annular shape, and a surface 25 thereof facing toward the display D side (hereinafter referred to as "receiving surface 25") is formed into a spherically-shaped surface having the same curvature as the base-side sliding surface 13a (see FIG. 2) of the flange 10B. As shown in FIG. 4, the receiving surface 25 is slidably brought into contact with the base-side sliding surface 13a of the flange 10B.

The support cap 30 is made of plastic, and includes, as shown in FIGS. 1 and 2, a dome portion 31 having a domical shape, a pair of wall portions 32 protruding from a display D side surface of the dome portion 31, and a second engageable part 33 provided at the display D side of the dome portion 31. The second engageable part 33 is a part to be engaged with a first engageable portion 41 of the corotation restricting member 40 that will be described later. The support cap 30 is housed in the inside (i.e., space formed between the mounting plate 10A and the flange 10B) of the movable part 10, as shown in FIG. 4.

The dome portion 31, as shown in FIG. 2, has a base 20 side surface 31a (hereinafter referred to as "pressing surface 31a") formed into a spherically-shaped surface having the same curvature as the display-side sliding surface 13b (see FIG. 1) of the flange 10B. As shown in FIG. 4, the pressing surface 31a is slidably brought into contact with the display-side sliding surface 31b of the flange 10B. The dome portion 31 is provided substantially at the center thereof with an insertion hole 21a through which the shaft part 42 of the corotation restricting member 40 that will be described later can be inserted.

The paired wall portions 32 are, as shown in FIG. 1, arranged on a straight line containing the insertion hole 31b, and disposed so as to sandwich the insertion hole 31b.

The second engageable part 33 is, as shown in FIG. 1, formed by fitting a clutch member 33B having a generally annular shape into a circular edge portion 33A formed along the circular edge of the insertion hole 31b.

Figure 5:
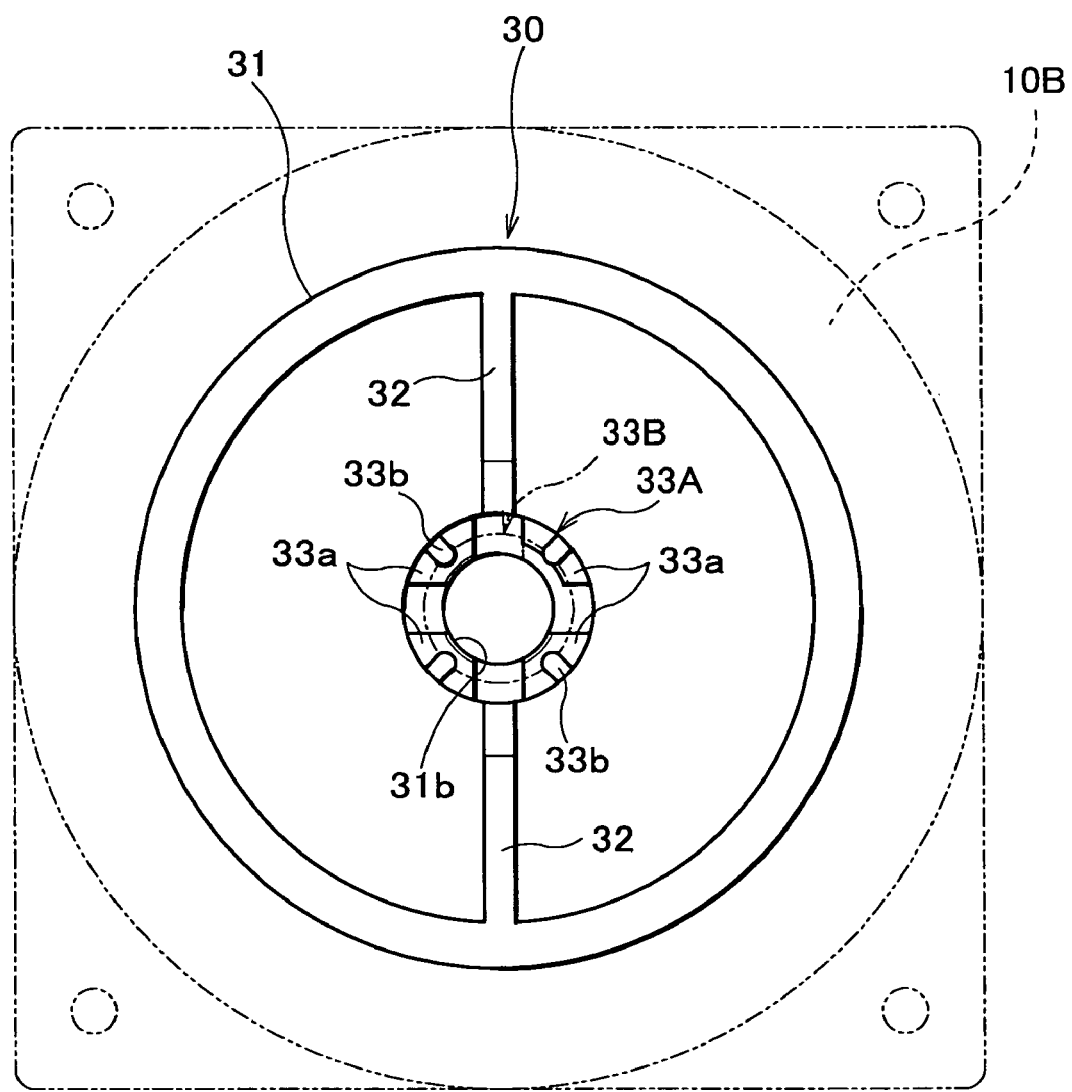
FIG. 5 is a front elevation of a support cap.

The circular edge portion 33A is formed by depressing part of the display D side surface of the dome portion 31 along the circular edge of the insertion hole 31b. As shown in FIG. 5, the circular edge portion 33A is provided with four sectorial stepwise portions 33a, each assuming a segmental shape as viewed from the front (i.e., the display side), in four places spaced at predetermined intervals. On an upper surface (facing toward the display side) of each sectorial stepwise portion 33a is formed a projection 33b.

The clutch member 33B is, as shown in FIGS. 6C and 6D, comprised of a ring-shaped metal sheet having four grooves 33d recessed toward the circular edge portion 33A. Four sectorial plate portions 33c disposed between adjacent grooves 33d each have a notch 33e formed at an outer circumferential edge thereof. The notches 33e are disposed in positions aligned with the respective projections 33b (see FIG. 6F) of the circular edge portion 33A, so that putting the clutch member 33B into the circular edge portion 33A allows the notches 33e of the clutch member 33B to become fitted on the corresponding projections 33b of the circular edge portion 33A, thereby bringing the sectorial plate portions 33c into contact with the corresponding sectorial stepwise portions. The grooves 33d are formed such that the protruded rear surfaces of the grooves 33d can be fitted into recessed portions between the sectorial stepwise portions 33a (see FIG. 6F) of the circular edge portion 33A; thus, putting the clutch member 33B into the circular edge portion 33A allows the rearwardly protruding grooves 33d to become fitted in the corresponding spaces provided between adjacent sectorial stepwise portions 33a of the circular edge portion 33A. The inside diameter of the clutch member 33B (i.e., the diameter of a circular opening thereof) is equal to the diameter of the insertion hole 31b (see FIG. 6F) of the dome portion 32. As shown in FIG. 6C, a side surface 33f (hereinafter referred to as "stopper surface 33f") of the groove 33d is oblique to the axis P (see FIG. 6A) of a shaft part 42 of the corotation restricting member 40.

The corotation restricting member 40 includes, as shown in FIGS. 1 and 2, a first engageable part 41 engageable with the second engageable part 33 provided in the support cap 30 from the display D side, and a shaft part 42 protruding from the first engageable part 41.

The first engageable part 41, as shown in FIGS. 6A and 6B, includes a base portion 41d having the same diameter as the inside diameter of the clutch member 33B (the diameter of the circular opening thereof), and a head portion 41c formed at an end surface of the base portion 41d. On the periphery of the base portion 41d are provided protrusions (or convex portions) 41a protruding therefrom. The protrusions 41a are provided in four places corresponding to the locations of the grooves 33d of the clutch member 33B, so as to become fitted into the groove 33d. As shown in FIG. 6A, a side surface 41b (hereinafter referred to as "contact surface 41b") of the protrusion 41a is oblique to the axis P of the shaft part 42, and thus fitting the protrusions 41a into the grooves 33d of the clutch member 33B brings the contact surfaces 41b into contact with the stopper surfaces 33f (see FIG. 6C) of the groove 33d.

The shaft part 42 includes a body portion 42a having the same diameter as the inside diameter of the insertion hole 21a (see FIG. 4) of the base body 20A, and a reduced diameter portion 42b disposed between the body portion 42a and the base portion 41d of the first engageable part 41, and at a distal end of the body portion 42a is provided a pin hole 42c extending in a direction perpendicular to the axis P.

Figure 7:
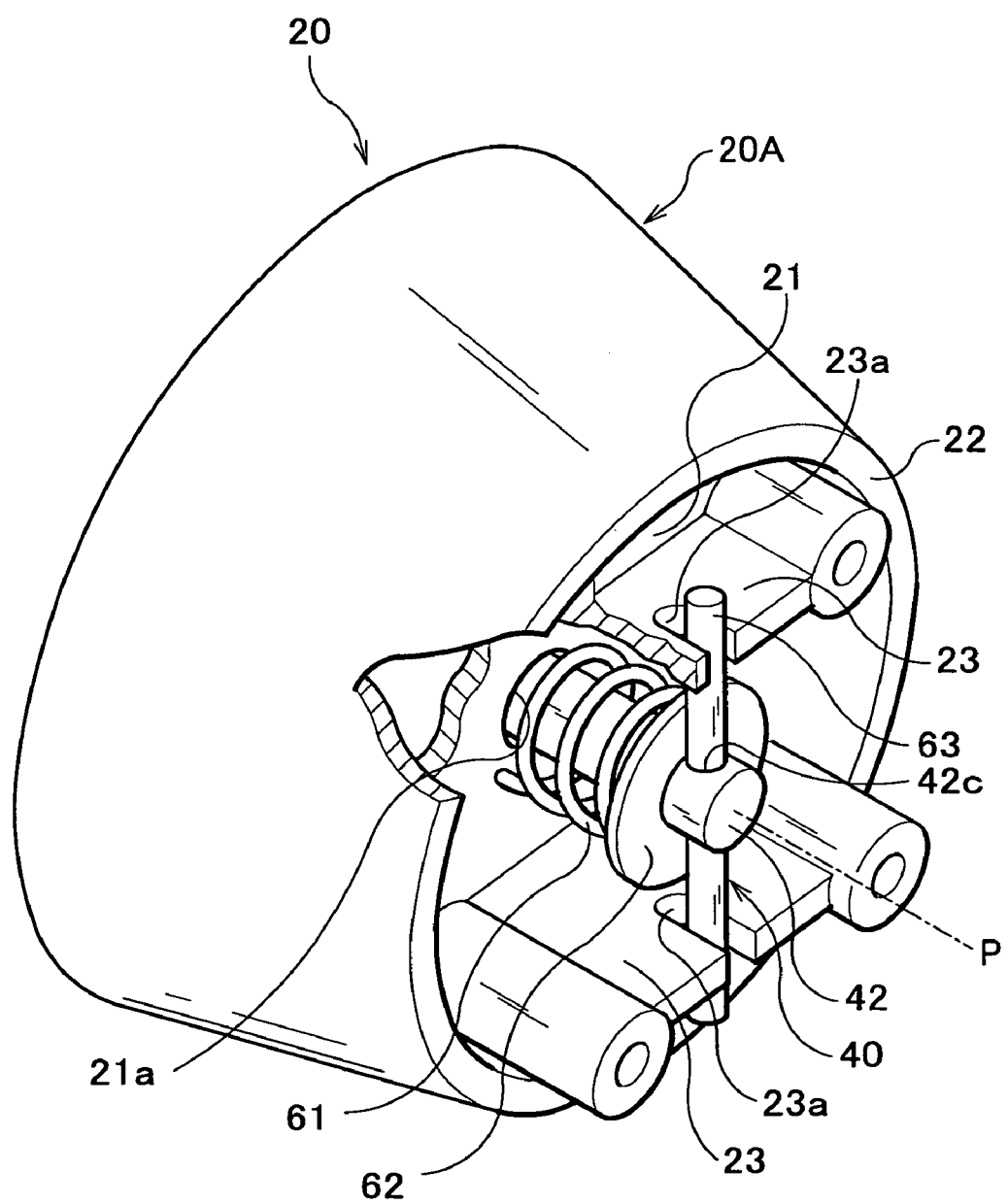
FIG. 7 is a partially cutaway perspective view of a base as shown in FIG. 2.

The shaft part 42 is mounted on the base body 20A in a manner that prohibits the shaft part 42 from pivoting about the axis P thereof and that permits the shaft part 42 to move along the axis P thereof. To be more specific, as shown in FIG. 7, the shaft part 42 is prevented from pivoting about the axis P thereof because a pin is inserted into the pin hole 42c formed at the distal end of the shaft part 42 and each end of the pin 63 protruding from the pin hole 42c is fitted into the notch 23a formed in the mid-wall portion 23 of the base body 20A. Further, the shaft 42 is permitted to move along the axis P thereof, because the depth of the notch 23a is greater than a diameter of the pin 63 and the notch 23a is formed in a direction parallel to the axis P.

As shown in FIG. 7, around the shaft part 42 is coiled a stressing member 61 in a compressed state, and a stress (resiliency) generated by the stressing member 61 is transmitted through the pin 63 to the shaft part 42, which in turn stresses the first engageable part 41 (see FIG. 4) toward the base 20 side. In other words, the first engageable part 41 is stressed (biased) toward the base 20 side by the stressing member 61 disposed in a compressed state between the pin 63 piercing the distal end of the shaft part 42 and the bottom wall portion 21 of the base body 20A. FIG. 7 also shows a washer 62 provided according to the present embodiment between stressing member 61 and the pin 63 to reliably transmit the stress generated by the stressing member 61 to the shaft part 42. In the present embodiment, the illustrated stressing member is a coiled spring, but the present invention is not limited thereto, and any alternative member such as a leaf spring or a coned disc spring (Belleville spring) may be used as the stressing member 61.

The stress applied to the first engageable part 41 toward the base 20 side enables secure engagement of the first engageable part 41 with the second engageable part 33 of the support cap 30, as shown in FIG. 4.

Since the first engageable part 41 stressed toward the base 20 side is engaged with the second engageable part 33 of the support cap from the display D side as shown in FIG. 4, the support cap 30 too is stressed toward the base 20 side. To be more specific, the stress generated by the stressing member 61 is transmitted to the support cap 30 through the corotation restricting member 40 and acts thereon, and the support cap 30 in turn presses the spherical zone portion 13 of the movable part 10 toward the base 20 side.

As described above, the shaft part 42 of the corotation restricting member 40 is not allowed to pivot about the axis P, and thus the first engageable part 41 is not allowed to rotate about the axis P as a matter of course, either. Consequently, the support cap 30 with which the first engageable part 41 is engaged becomes unable to pivot about the axis P. That is, as long as the first engageable part 41 is engaged with the second engageable part 33 of the support cap 30, the wall portions 32 of the support cap 30 never shift their positions, and thus a range of pivotal motion of the movable part 10 is restricted by the wall portions 32. More specifically, in the present embodiment, the wall portions 32 of the support cap 30 of which the second engageable part 33 is engaged with the first engageable part 41 serves as a stopper 50 to restrict the range of pivotal motion of the movable part 10.

Next, a description will be given of a process of assembling the components, as described above, of the orientation adjustment apparatus H.

First, as shown in FIG. 1, the spacer 20B is fitted into the opening of the base body 20A facing toward the display D side, and the spherical zone portion 13 of the flange 10B is sandwiched between the spacer 20B and the support cap 30.

Then, the clutch member 33B is fitted into the circular edge portion 33A of the support cap 30 from the display D side to form the second engageable part 33. Further, the shaft part 42 of the corotation restricting member 40 is inserted into the insertion hole 31b of the support cap 30 and the insertion hole 21a of the base body 20A, and the first engageable part 41 is engaged with the second engageable part 33 of the support cap 30 from the display D side.

Subsequently, as shown in FIG. 7, the coiled stressing member 61 and the washer 62 are fitted on the shaft part 42 of the corotation restricting member 40 that protrudes from the insertion hole 21a of the base body 20A. Then, insertion of the pin 63 through the pin hole 42c of the shaft part 42 while the stressing member 61 is being compressed is followed by insertion of each end of the pin 63 into the notches 23a of the mid-wall portions 23. The above assembling process enables the stressing member 61 to transmit its stress (biasing force) through the corotation restricting member 40 to the support cap 30, and leads to secure engagement of the first engageable part 41 with the second engageable part 33 of the support cap 30, thus causing the spherical zone portion 13 of the movable part 10 to be held by the base 20 and the support cap 30 with an adequate pressing force.

Thereafter, as shown in FIG. 2, the mounting plate 10A is disposed on the display D side of the flange 10B, and the mounting holes 11a of the mounting plate 10A are aligned with the corresponding mounting holes 14a of the flange 10B. Then, screws or other fastening means (not shown) are inserted into the mounting holes 14a to fix the mounting plate 10A and the flange 10B together on the rear surface of the display D. To attach the orientation adjustment apparatus H to the stand M, bosses 24 are aligned with the mounts M1 of the stand M, and fastening means (not shown) are inserted from the rear side of the stand M and fastened.

Next, a description will be given of an ordinary-time operation of the orientation adjustment apparatus H having the components assembled as described above.

As shown in FIG. 4, the spherical zone portion 13 of the movable part 10 is sandwiched between the pressing surface 31a of the support cap 30 and the receiving surface 25 of the base 20 (spacer 20B) and held by them with an adequate pressing force. Moreover, the base-side sliding surface 13a and the receiving surface 25 of the base 20 in contact therewith each have a spherical surface, and the display-side sliding surface 13b and the pressing surface 31a of the support cap 30 each have a spherical surface. Accordingly, the spherical zone portion 13 of the movable part 10 can be slid arbitrarily and smoothly between the pressing surface 31a of the support cap 30 and the receiving surface 25 of the base 20 (spacer 20B). Consequently, according to the orientation adjustment apparatus H, the display D can be pivoted (see FIG. 12A), tilted (see FIG. 12B), and swiveled (see FIG. 12C).

Figure 8A:
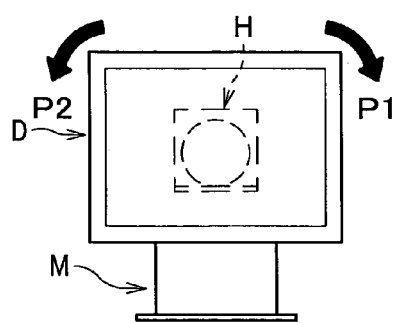
Figure 8B:
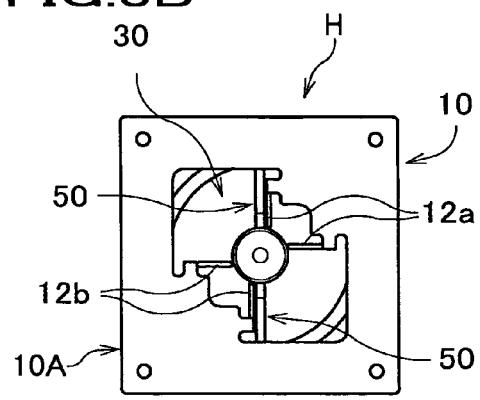
Figure 8C:
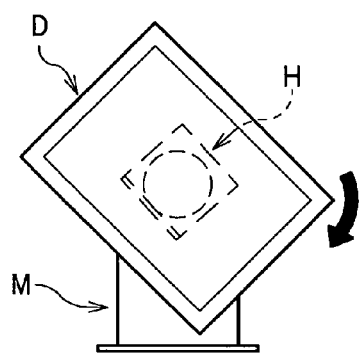
Figure 8D:
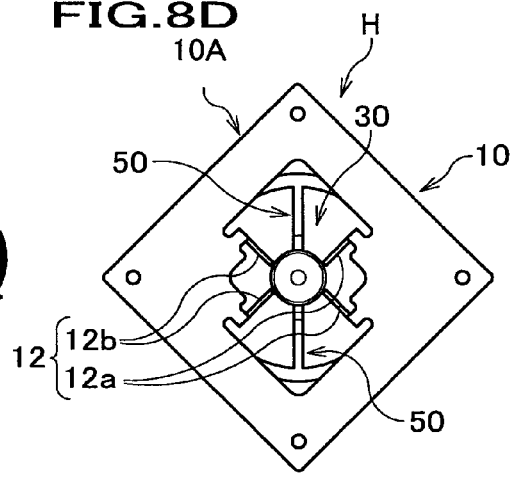
Figure 8E:
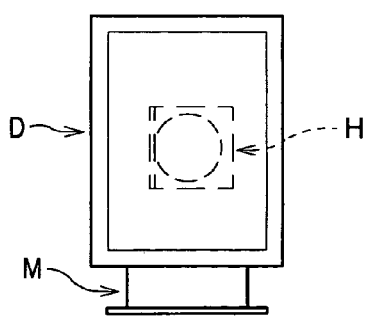
Figure 8F:
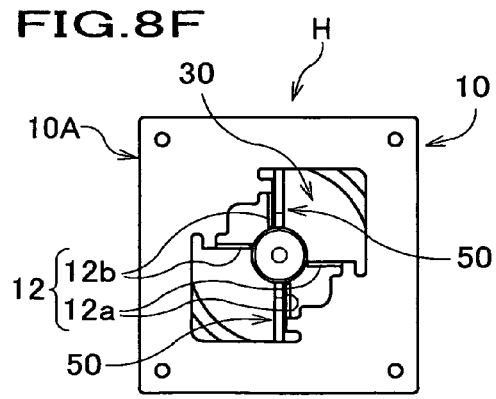

Taking, as an example, an instance where the display D in landscape orientation as shown in FIG. 8A is pivoted 90 degrees clockwise into portrait orientation as shown in FIG. 8E, the ordinary-time operation of the orientation adjustment apparatus H will now be described further in detail.

FIG. 8B is a front elevation showing a status of the orientation adjustment apparatus H when the display D is in landscape orientation (see also FIG. 8A). The pivotal motion restricting portion 12 (one of the projection pieces 12a and one of the projection pieces 12b) of the movable part 10 is brought into contact with the stopper 50 (wall portion 32 thereof) provided in the support cap 30, so that counterclockwise pivotal motion (toward a direction indicated by an arrow P2 in FIG. 8A) of the display D is prohibited.

When the display D in this state is pivoted clockwise (toward a direction indicated by an arrow P1 in FIG. 8A), the movable part 10 alone is pivoted with the display D as shown in FIG. 8D, because the support cap 30 cannot be pivoted.

When the display D has eventually been pivoted 90 degrees clockwise, the pivotal motion restricting portion 12 of the movable part 10 is brought into contact with the stopper 50, so that the movable part 10 is prohibited from pivoting further.

Next, an operation of the orientation adjustment apparatus H observed when the display D with the movable part 10 prohibited from pivoting by the stopper 50 is inadvertently pivoted counterclockwise will be described with reference to FIGS. 9A, 9B and 9C.

FIG. 9A is a cross-sectional view illustrating a relationship between the corotation restricting member 40 and the support cap 30 observed when the display D is in a state as shown in FIG. 8A.

When the display D in the state as shown in FIG. 8A is forced to be pivoted counterclockwise (in the direction indicated by the arrow P2 in FIG. 8A), the pivoting force is exerted on the stopper 50, i.e., support cap 30, because the pivotal motion restricting portion 12 of the movable part 10 is in contact with the stopper 50 (see FIG. 8B). Since the support cap 30 is engaged with the corotation restricting member 40, and is thereby prohibited from pivoting, the pivoting force eventually acts on the first engageable part 41 of the corotation restricting member 40.

As shown in FIG. 9A, however, the contact surface 41b of the first engageable part 41 of the corotation restricting member 40 and the stopper surface 33f of the second engageable part 33 of the support cap 30, which is brought into contact with the contact surface 41b in radial directions along a circumferential plane around the axis P, are oblique to the axis P of the shaft part 42, and thus the first engageable part 41 is pressed in a direction parallel to the axis P.

Since the corotation restricting member 40 can move along the axis P as described above, the pressing force derived from the above pivoting force causes the first engageable part 41 of the corotation restricting member 40 to move toward the display D side as shown in FIG. 9B, and thus releases the engagement of the first engageable part 41 with the second engageable part 33 of the support cap 30. It is understood that the pressing force then acts on the stressing member 61 and further compresses the stressing member 61 beyond the ordinary state thereof.

Figure 10A:
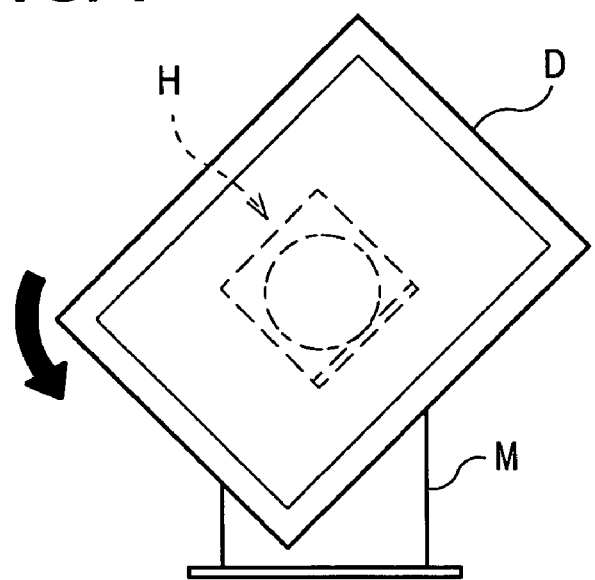
FIG. 10A is a schematic diagram for explaining operation of the display in extraordinary times when it is excessively oriented.
Figure 10B:
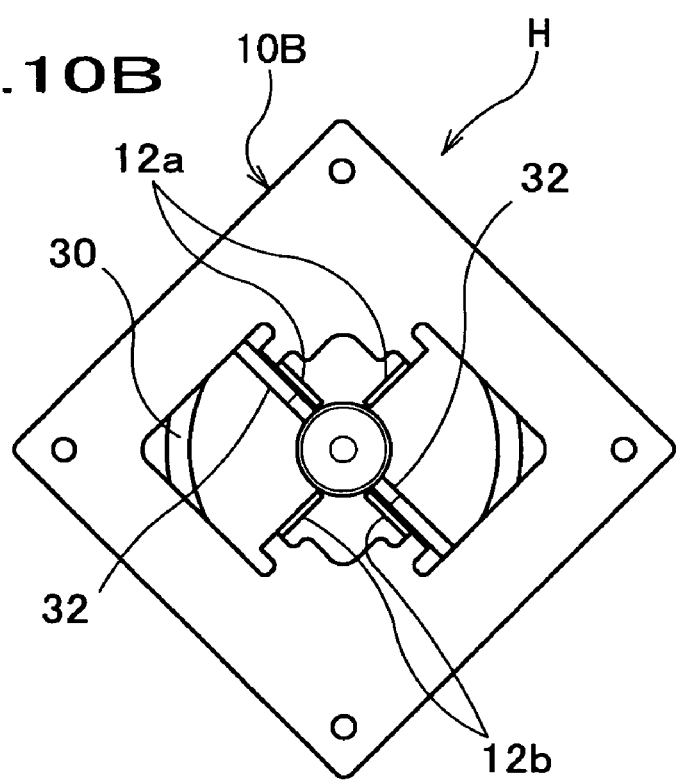
FIG. 10B is a front elevation showing a status of the orientation adjustment apparatus corresponding to the excessively oriented state of the display shown in FIG. 10A.

When the engagement of the support cap 30 with the corotation restricting member 40 is released, the support cap 30 is allowed to pivot with the movable part 10, as shown in FIG. 10B. That is, with the prohibited state by the stopper 50 being released, the movable part 10 is allowed to pivot beyond the permissible range of the pivotal motion.

As described above, the orientation adjustment apparatus H according to the present embodiment is configured to allow the stopper 50 to be released if the movable part 10 is pivoted by a pivoting force of a predetermined magnitude or greater beyond the range restricted by the stopper 50. Therefore, the movable part 10 or the support cap 30 can be prevented from undergoing breakage. To be more specific, even if a pivoting force of a predetermined magnitude or greater is exerted on the stopper 50 when the movable part 10 comes to a limit of the permissible range of the pivotal motion thereof, the first engageable part 41 of the corotation restricting member 40 moves toward the display D side and is thus disengaged from the second engageable part 33 of the support cap 30. Accordingly, the movable part 10 is allowed to pivot beyond the permissible range of the pivotal motion thereof, so that the excessive pivoting force as above never concentrates on those components such as the movable part 10, the stopper 50, etc., and the breakage thereof can thus be prevented.

Moreover, there is provided a very simple mechanism for releasing the engagement of the first engageable part 41 of the corotation restricting member 40 with the second engageable part 33 of the support cap 30. Therefore, the orientation adjustment apparatus H according to the present embodiment can be manufactured with ease. Further, the simplicity of the mechanism allows the engagement to be released without fail on an as-needed basis.

Even when an counterclockwise pivoting force is exerted, the pivotal motion of the support cap 30 is restricted as long as the first engageable part 41 of the corotation restricting member 40 is engaged with the second engageable part 33 of the support cap 30, with the result that the position of the stopper 50 is kept at a fixed position. Accordingly, even in cases where such a counterclockwise pivoting force is exerted, if it is such a case that the pivoting force is sufficiently small, the engagement will not be released, and thus the movable part 10 will never be pivoted beyond the permissible range of the pivotal motion thereof.

Moreover, even when the engagement of the support cap 30 with the corotation restricting member 40 is released, the shaft part 42 is still stressed toward the base 20, and thus a clockwise pivoting operation for the display D reengages the support cap 30 with the corotation restricting member 40, so that a normal state is restored.

Further, even when the engagement of the support cap 30 with the corotation restricting member 40 is released, the protrusion 41a of the first engageable part 41 rides on the sectorial plate portion 33c as shown in FIG. 9C, and thus the resiliency of the stressing member 61 is continuously transmitted to the support cap 30 without intermission. Accordingly, even if the support cap 30 is disengaged from the corotation restricting member 40, the spherical zone portion 13 of the movable part 10 is held therebetween with an adequate pressing force, and thus a holding force exerted on the spherical zone portion 13 would not be reduced below a level necessitated therefor.

Furthermore, as shown in FIGS. 9A through 9C, when the support cap 30 is disengaged from the corotation restricting member 40, among the components of the orientation adjustment apparatus H, only the corotation restricting member 40 moves toward the display D side, i.e., neither the movable part 10 nor the support cap 30 moves toward the display D side; thus, no impulsive force due to the disengagement is exerted on the display D.

In order to adjust the magnitude of the pivoting force capable of disengaging the first engageable part 41 of the corotation restricting member 40 from the second engageable part 33 of the support cap 30, the tilt angle of the contact surface 41d of the first engageable part 41 of the corotation restricting member 40 and the stopper surface 33f of the second engageable part 33 of the support cap 30 with respect to the axis P may be varied, or the depth of the grooves 33d of the clutch member 33B may be adjusted. In the present embodiment, the second engageable part 33 is formed by fitting the clutch member 33B into the circular edge portion 33A of the support cap 30, and thus the magnitude of the pivoting force by which or greater disengagement would take place can be varied merely by altering the dimensions or shape of the clutch member 33B.

The magnitude of the pivoting force by which or greater disengagement would take place may also be varied by changing the spring constant of the stressing member 61. To be more specific, in order to disengage the first engageable part 41 of the corotation restricting member 40 from the second engageable part 33 of the support cap 30, the first engageable part 41 is moved toward the display D side against the stress generated by the stressing member 61 according to the present embodiment; therefore, the greater the stress, the less likely the disengagement is to take place, and the smaller the stress, the more likely the disengagement is to take place.

As described above, since the stress of the stressing member 61 (resiliency of the coiled spring) is always transmitted through the corotation restricting member 40 to the support cap 30, the support cap 30 is always stressed (biased) toward the base 20 side, not only in an ordinary state where the first engageable part 41 of the corotation restricting member 40 has been engaged with the second engageable part 33 of the support cap 30, but also in a state where the engagement has been released. Accordingly, the stressing member 61 plays a plurality of roles which includes: to stress the support cap 30 toward the base 20 side in the ordinary state of use, to adjust the magnitude of pivoting force by which or greater the corotation restricting member 40 is to be disengaged from the support cap 30, and to prohibit the movable part 10 to further pivot beyond a range necessitated therefor when the engagement is released. Since the stressing member 61 can play a plurality of roles as above, the number of parts may be reduced and the construction of the apparatus is simplified, thus contributing to reduced cost.

[Second Embodiment]

A second embodiment of the orientation adjustment apparatus H' according to the present invention includes, as shown in FIG. 11, a movable part 70 attached to a rear surface of the display D, a base 80 for pivotably supporting the movable part 70, a support cap 90 for pressing the movable part 70 toward a base 80 side, and a corotation restricting member 40 for restricting pivotal motion of the support cap 90. In the support cap 90 is mounted a stopper 95 for restricting a range of pivotal motion of the movable part 70.

Figure 11A:
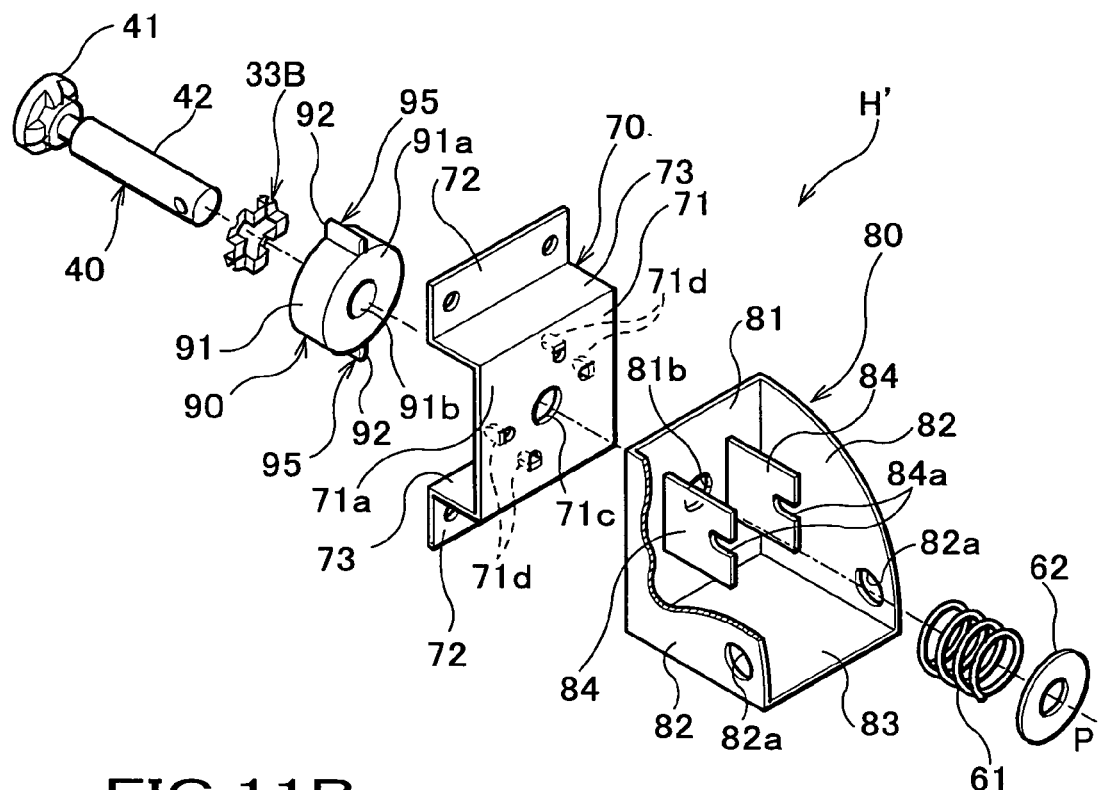
FIG. 11A is an exploded perspective view of a second embodiment of the display orientation adjustment apparatus according to the present invention.
Figure 11B:
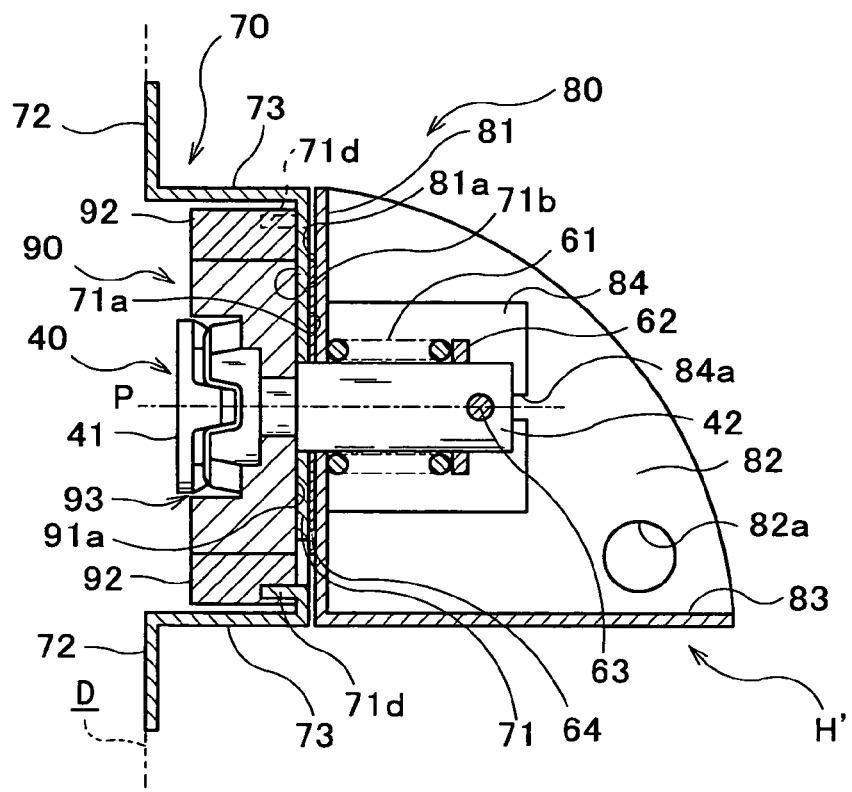
FIG. 11B is a side sectional view of the display orientation adjustment apparatus of FIG. 11A.

The movable part 70 includes, as shown in FIGS. 11A, 11B, a flat portion 71, a pair of mounting portions 72 disposed parallel to the flat portion 71, and a pair of side plate portions 73 for joining the flat portion 71 to the mounting portions 72.

The flat portion 71 is provided with an insertion hole 71c substantially in the middle section thereof, and in four places around the insertion hole 71c are projections 71d formed by partially cutting the flat portion 71 and bending each portion so as to raise it straight up toward a display D side. A surface 71a (hereinafter referred to as "base-side sliding surface 71a") of the flat portion 71 facing toward the base 80 side and a surface 71b (hereinafter referred to as "display-side surface 71b") thereof facing toward the display side are both formed flat.

The base 80 includes a tabular receiving portion 81, side wall portions 82 perpendicularly extending from each side edge of the receiving portion 81, a bottom wall portion 83 perpendicularly extending from a bottom edge of the receiving portion 81, and a pair of mid-wall portions 84 provided in places at predetermined intervals substantially at the center of the receiving portion 81 so as to perpendicularly protrude therefrom. A surface 81a (hereinafter referred to as "receiving surface 81a") of the receiving portion 81 facing toward the display D side is formed flat. The receiving portion 81 is provided with an insertion hole 81b. The mid-wall portions 84 are opposed to each other and disposed in such positions as to sandwich the insertion hole 81b. In each of the mid-wall portions 84, a U-shaped notch 84a is provided from a distal end of the mid-wall portion 23 and extending toward the receiving portion 81 in a direction parallel to an axis P of the corotation restricting member 40. Into an insertion hole 82a provided in each side wall portion 82 is fitted a shaft member (not shown) for tilting the orientation adjustment apparatus H'.

The support cap 90 includes a body portion 91 having each end (perimeter) formed circular, wall portions 92 protruding from the periphery of the body portion 91, and a second engageable part 93 (see FIG. 11B) provided at the display D side of the body portion 91. In middle of the circular end faces (flat faces) of the body portion 91 are provided an insertion hole 91b, and the paired wall portions 92 are aligned with one plane containing the insertion hole 91b so that the wall portions 92 sandwich the insertion hole 91b. An end face 91a (hereinafter referred to as "pressing surface 91a") of the body portion 91 facing toward the base 80 side is formed flat. It is to be understood that the second engageable part 93 has substantially the same construction as the second engageable part 33 of the support cap 30 according to the first embodiment, and thus a further detailed description will be omitted herein.

It is also to be understood that the corotation restricting member 40 and the stressing member 61 each have substantially the same construction as the corresponding components as described above in the first embodiment, and a detailed duplicate description will not be given herein. However, the shaft part 42 of the corotation restricting member 40 is mounted on the base 80 in a manner that prohibits the shaft part 42 from pivoting about the axis P thereof and that permits the shaft part 42 to move along the axis P. In addition, the first engageable part 41 is stressed toward the base 80 side by the stressing member 61 disposed in a compressed state between a pin 63 inserted through the distal end of the shaft part 42 and the receiving portion 81 of the base 80.

Moreover, in the present embodiment, a wall portion 92 of the support cap 90 of which the second engageable part 93 has been engaged with the first engageable part 41 serves as a stopper 95 for restricting a range of pivotal motion of the movable part 70.

In the second embodiment of the orientation adjustment apparatus H1 according to the present invention, which is constructed as described above, the flat portion 71 of the movable part 70 is, as shown in FIG. 11B, sandwiched between the pressing surface 91a of the support cap 90 and the receiving surface 81a of the base 80 and held by an adequate pressing force, and the base-side sliding surface 71a and the receiving surface 81a of the base 80 in contact therewith each include a flat surface, while the display-side sliding surface 71b and the pressing surface 91a of the support cap 90 in contact therewith each include a flat surface. Accordingly, the flat portion 71 of the movable part 70 can be arbitrarily slid between the pressing surface 91a of the support cap 90 and the receiving surface 81a of the base 80. As shown in FIG. 11B, in the present embodiment, a spacer 64 is provided between the flat portion 71 of the movable part 70 and the receiving portion 81 of the base 80.

Consequently, the orientation adjustment apparatus H' according to the present embodiment is configured to allow the stopper 95 to be released (i.e., moving the first engageable part 41 of the corotation restricting member 40 toward the display D side and becomes disengaged from the second engageable part 93 of the support cap 90) and thus allow the movable part to pivot beyond the permissible range of the pivotal motion thereof, if the movable part 10 is pivoted by a pivoting force of a predetermined magnitude or greater beyond the range restricted by the stopper 95. Therefore, the excessive pivoting force as above would never concentrate on those components such as the movable part 70, the stopper 90, etc., and the breakage thereof can thus be prevented.

Although the preferred embodiments of the present invention have been described above, various modifications and changes may be made in the present invention without departing from the spirit and scope thereof.

In conclusion, with the display orientation adjustment apparatus according to the present invention, the display can be supported in a manner that permits the display to pivot about an axis substantially perpendicular to a screen thereof, and even if the display is pivoted inadvertently beyond a permissible range of pivotal motion thereof, breakage of components thereof would never take place, and its normal state of use can easily be restored.

What is claimed is:

1. A display orientation adjustment apparatus comprising:
   a movable part configured to be attached to a rear surface of a display;
   a base pivotably supporting the movable part;
   a stopper configured to limit a range of pivotal motion of the movable part; and
   a clutch unit configured to release the stopper not to prevent the pivotal motion of the movable part when a force which the stopper receives by preventing the pivotal motion is larger than a predetermined value.

2. A display orientation adjustment apparatus according to claim 1, further comprising:
   a support cap configured to press the movable part toward a base side, the stopper being mounted in the support cap; and
   a corotation restricting member configured to restrict pivotal motion of the support cap, the corotation restricting member including a first engageable part and a shaft part protruding from the first engageable part, the support cap including a second engageable part, the first engageable part of the corotation restricting member being engageable with the second engageable part of the support cap from a display side,
   wherein the shaft part is mounted on the base in a manner such that the shaft part is prevented from pivoting about an axis of the shaft part and such that the shaft part is allowed to move along the axis if the first engageable part is pivoted beyond the range by a pivoting force of the predetermined magnitude or greater, and
   wherein if the first engageable part of the corotation restricting member engaged with the second engageable part of the support cap is pivoted beyond the restricted range by a pivoting force of the predetermined magnitude or greater, the shaft part of the corotation restricting member moves toward the display side, and gets disengaged from the second engageable part of the support cap.

3. A display orientation adjustment apparatus according to claim 2, wherein the first engageable part of the corotation restricting member is stressed toward the base.

4. A display orientation adjustment apparatus according to claim 3, further comprising:
   a stressing member mounted in the base configured to stress the first engageable part of the corotation restricting member toward the base side,
   wherein a stress generated by the stressing member causes the support cap to press the movable part toward the base side.

5. A display orientation adjustment apparatus according to claim 2, wherein the first engageable part of the corotation restricting member includes a contact surface oblique to the axis of the shaft part, and wherein the second engageable part of the support cap includes a stopper surface configured to contact with the contact surface of the first engageable part.

6. A display orientation adjustment apparatus according to claim 1, wherein the movable part includes a sliding surface shaped as a spherical zone, and wherein the base includes a receiving surface for slidable contact with the sliding surface.

* * * * *